(12) United States Patent  
Tsiberidis

(10) Patent No.: US 11,498,359 B2  
(45) Date of Patent: Nov. 15, 2022

(54) EMERGENCY OPERATION ATTACHMENT FOR A VEHICLE WHEEL

(71) Applicant: GV Engineering GmbH, Heimsheim (DE)

(72) Inventor: Konstantin Tsiberidis, Untergruppenbach (DE)

(73) Assignee: GV Engineering GmbH, Heimsheim (DE)

( * ) Notice: Subject to any disclaimer, the term of this patent is extended or adjusted under 35 U.S.C. 154(b) by 530 days.

(21) Appl. No.: 16/486,415

(22) PCT Filed: Feb. 15, 2018

(86) PCT No.: PCT/EP2018/053764  
§ 371 (c)(1),  
(2) Date: Aug. 15, 2019

(87) PCT Pub. No.: WO2018/149910  
PCT Pub. Date: Aug. 23, 2018

(65) Prior Publication Data  
US 2020/0086683 A1 Mar. 19, 2020

(30) Foreign Application Priority Data  
Feb. 15, 2017 (DE) .......................... 102017103101.4

(51) Int. Cl.  
*B60B 11/10* (2006.01)  
*B60B 15/26* (2006.01)

(52) U.S. Cl.  
CPC ............ *B60B 11/10* (2013.01); *B60B 15/263* (2013.01); *B60B 2900/731* (2013.01)

(58) Field of Classification Search  
CPC ....... B60B 11/10; B60B 15/263; B60B 15/26; B60B 2900/731  
See application file for complete search history.

(56) References Cited

U.S. PATENT DOCUMENTS 941,341 A * 11/1909 Bradley .................. B60B 11/10  
301/40.4  
3,112,784 A 12/1963 Montenare  
3,116,094 A * 12/1963 Glasgow ................ B60B 11/10  
301/38.1

(Continued)

FOREIGN PATENT DOCUMENTS

GB 857897 A 1/1961  
WO WO-2021170657 A1 * 9/2021 ............. B60B 11/10

OTHER PUBLICATIONS

German language International Search Report and Written Opinion, dated Aug. 15, 2018, 16 pages.

(Continued)

*Primary Examiner* — Jason R Bellinger  
(74) *Attorney, Agent, or Firm* — Barnes & Thornburg LLP

(57) ABSTRACT

An attachment for a vehicle wheel allows operation when the tire is flat. The attachment may include a main body which is circular or substantially annular when seen in an axial direction, a positioning device for positioning the attachment on a rim of the vehicle wheel, and a fastening device for fastening the attachment to the rim of the vehicle wheel. The fastening device may be adapted to be actuated independently of the positioning device.

17 Claims, 23 Drawing Sheets

(56) References Cited

U.S. PATENT DOCUMENTS

| | | | | |
|---|---|---|---|---|
| 3,567,287 | A * | 3/1971 | Nutter | B60C 5/00 |
| | | | | 301/38.1 |
| 3,608,970 | A * | 9/1971 | Strumbos | B60B 11/10 |
| | | | | 301/38.1 |
| 4,666,216 | A * | 5/1987 | Smith | B60B 11/10 |
| | | | | 301/39.1 |
| 4,929,032 | A * | 5/1990 | Isaacson | B60B 11/10 |
| | | | | 301/38.1 |
| 5,000,518 | A * | 3/1991 | Markow | B60B 11/10 |
| | | | | 152/517 |
| 6,068,346 | A * | 5/2000 | Pender | B60B 11/10 |
| | | | | 301/40.3 |
| 6,217,125 | B1 | 4/2001 | Tubetto | |
| 2009/0267404 | A1 | 10/2009 | Thompkins | |
| 2020/0164682 | A1* | 5/2020 | Tsiberidis | B60B 19/00 |
| 2020/0223250 | A1* | 7/2020 | Tsiberidis | B60B 15/263 |
| 2020/0223252 | A1* | 7/2020 | Tsiberidis | B60B 11/10 |
| 2020/0247181 | A1* | 8/2020 | Tsiberidis | B60B 15/263 |

OTHER PUBLICATIONS

Partial English language translation of International Search Report and Written Opinion, dated Aug. 16, 2018, 3 pages.
Communication under Rule 71(3) EPC, Intent to Grant, European Application 18 707 301, dated Jan. 10, 2022.

\* cited by examiner

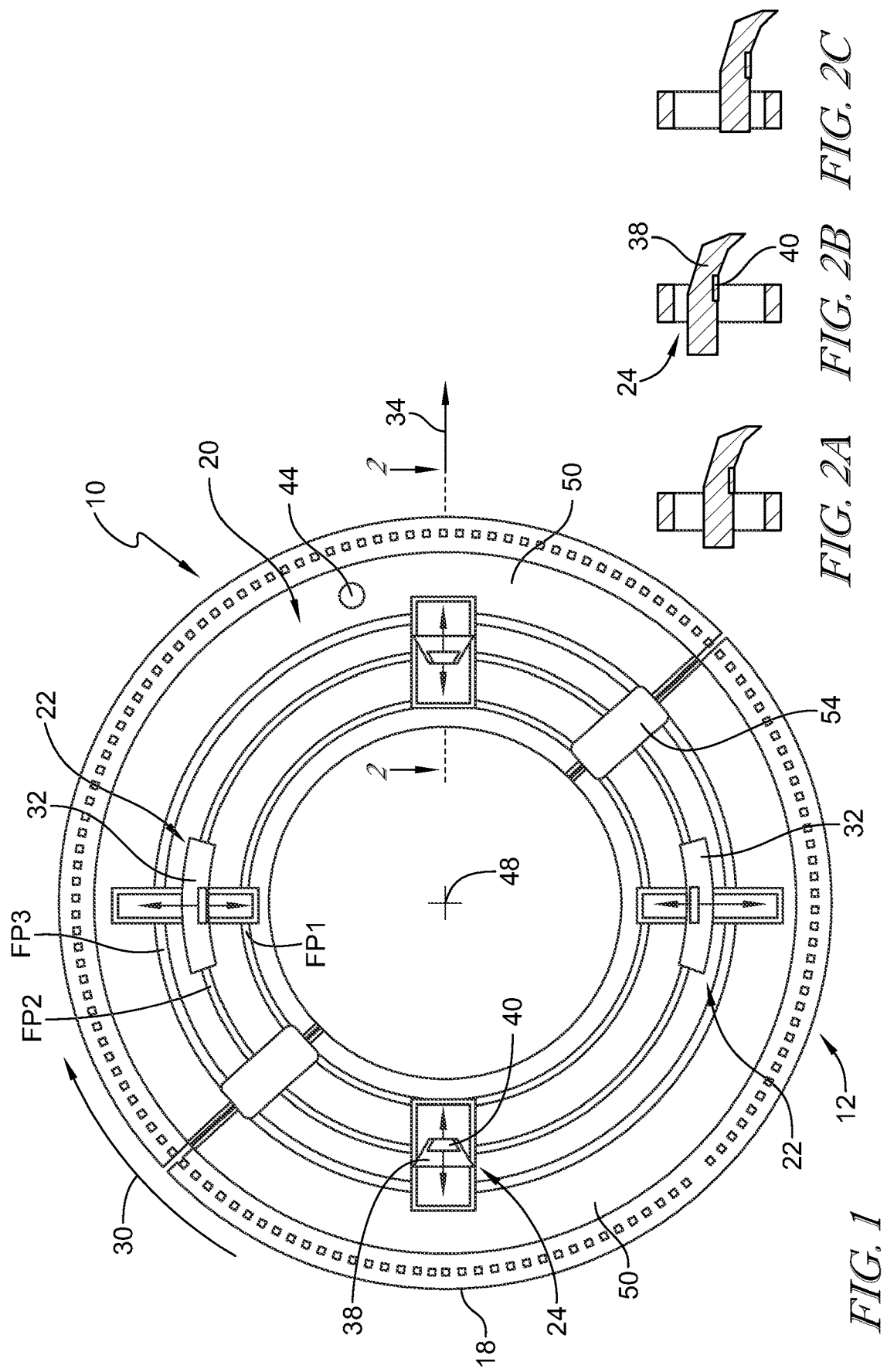

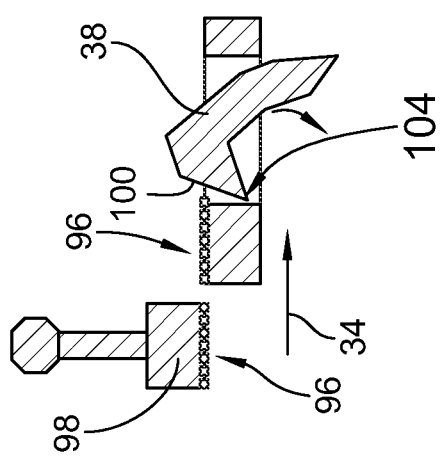
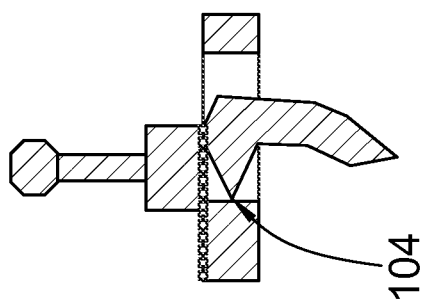
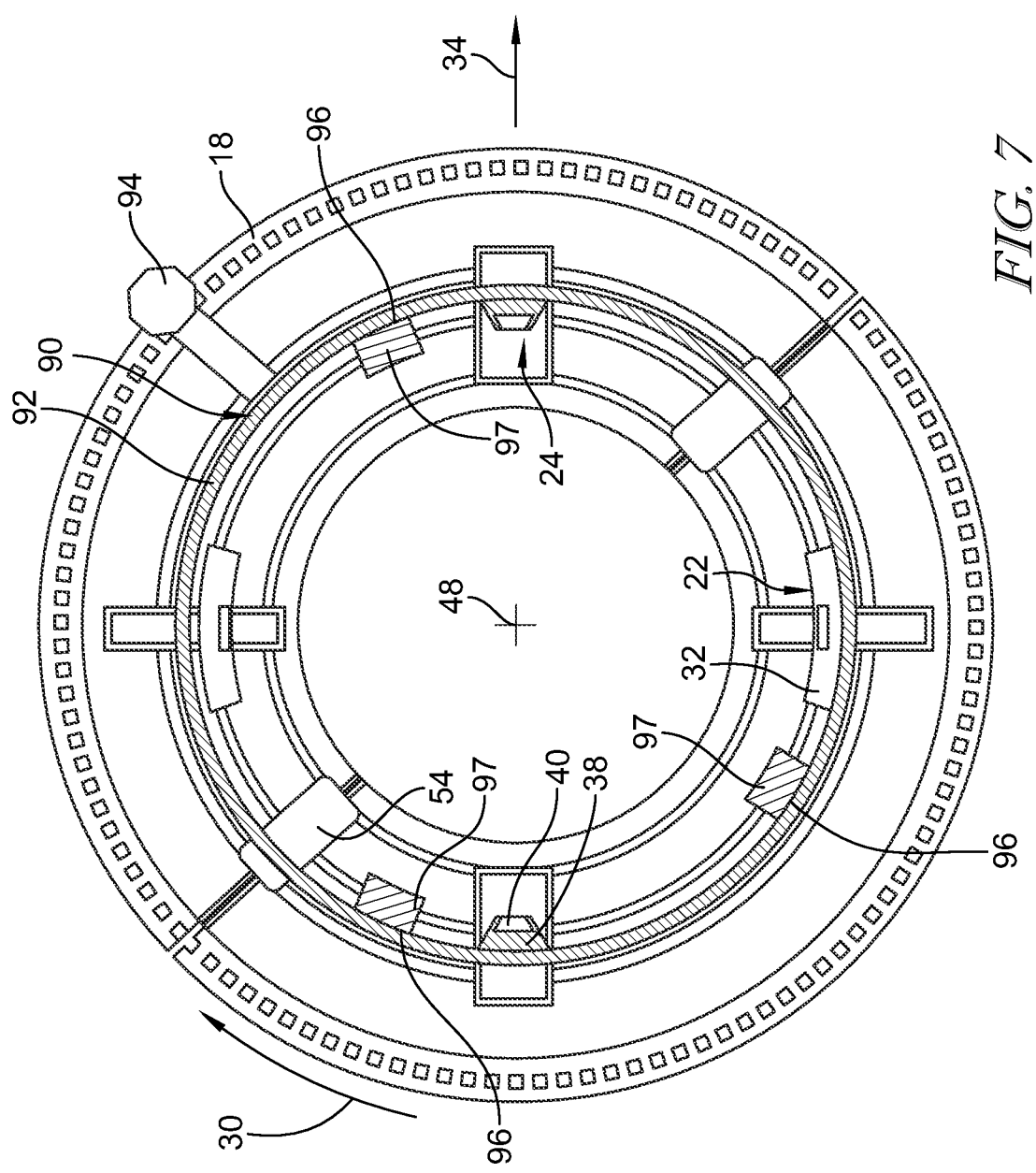
FIG. 8A
FIG. 8B
FIG. 7

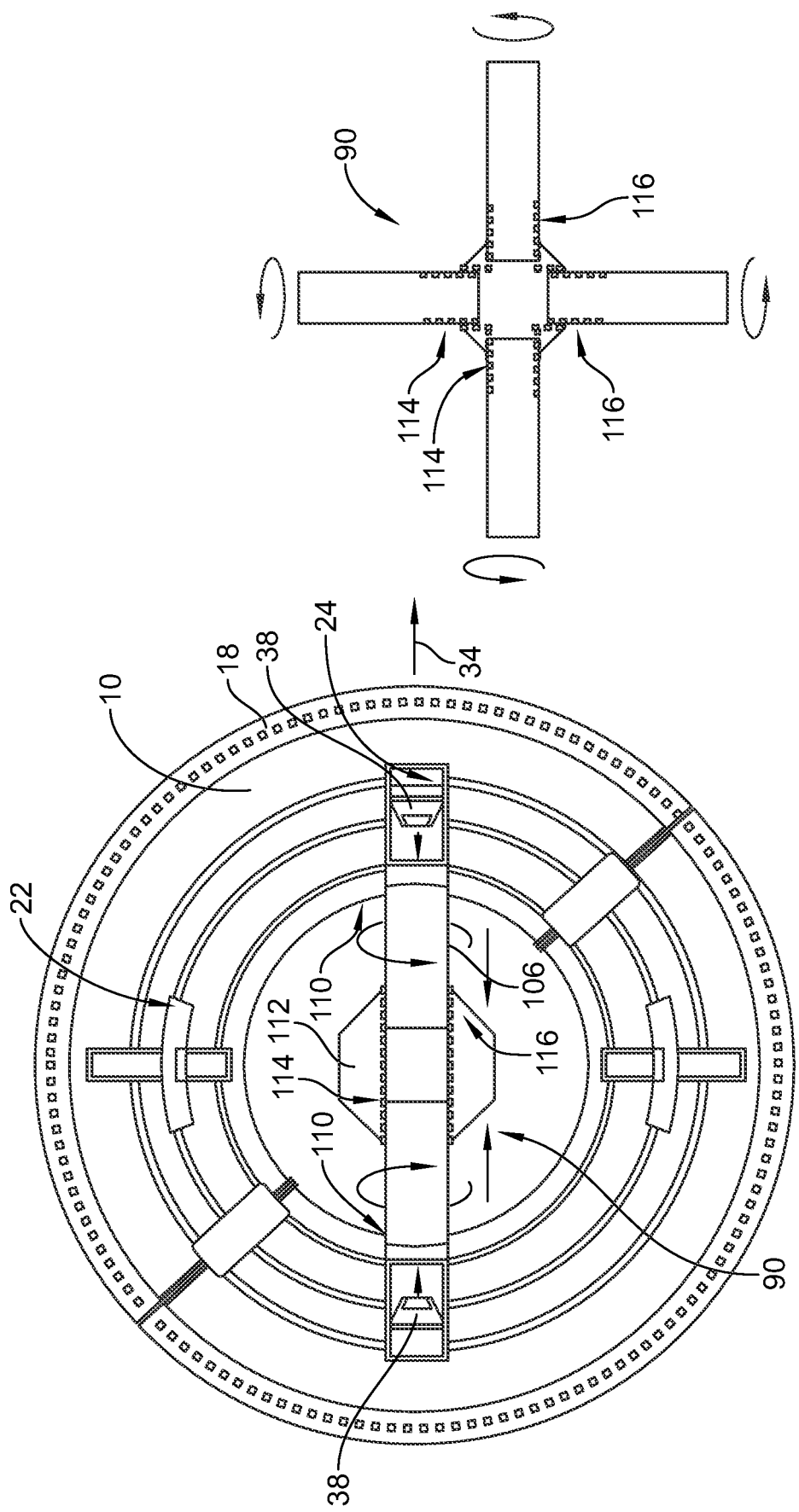

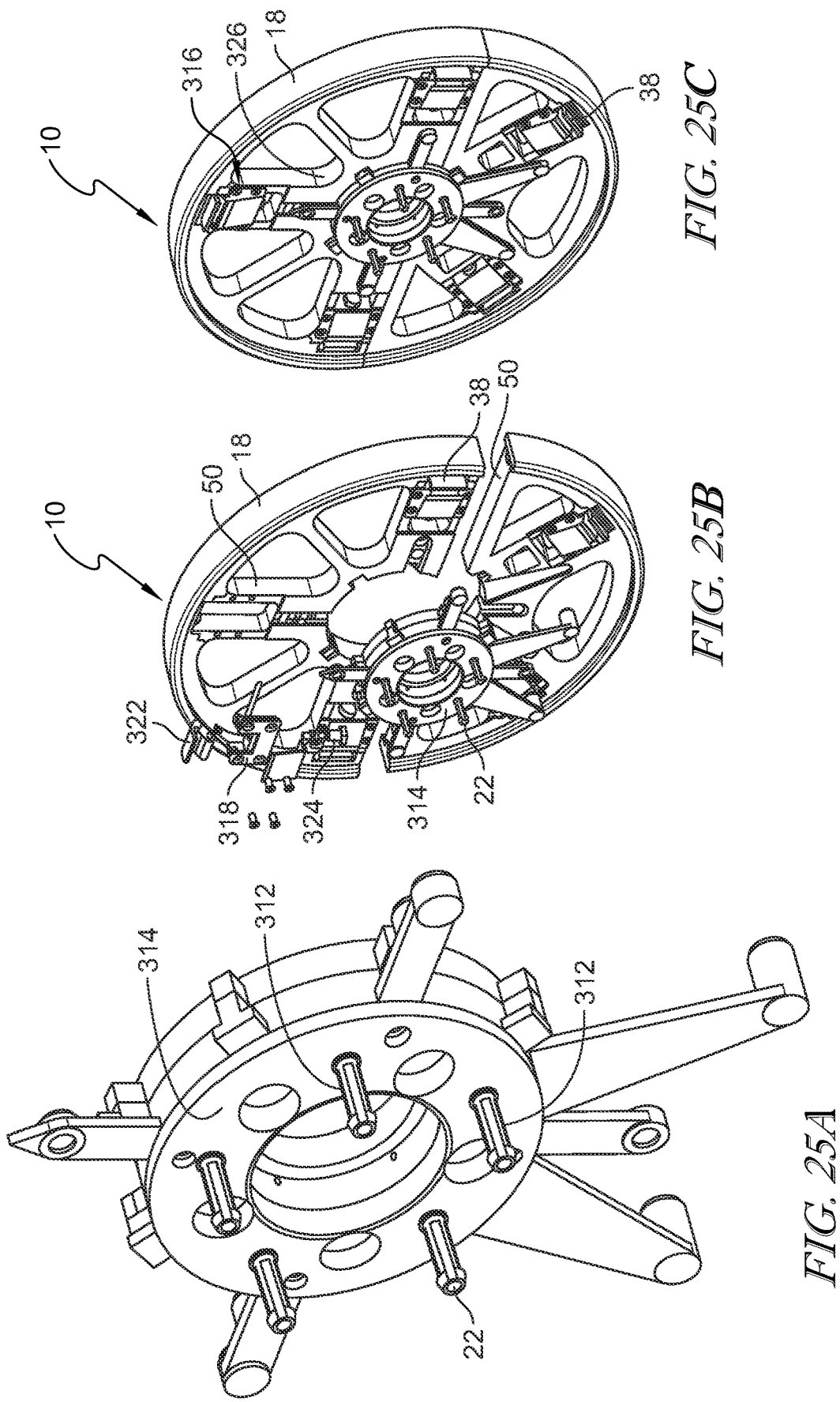

EMERGENCY OPERATION ATTACHMENT FOR A VEHICLE WHEEL

CROSS REFERENCE TO RELATED APPLICATIONS

This is a national stage entry of International Patent Application No. PCT/EP2018/053764, filed Feb. 15, 2018, which claims the benefit of and priority to German Patent Application No. 10 2017 103 101.4, filed Feb. 15, 2017, the disclosures of which are both expressly incorporated herein by reference in their entireties.

DESCRIPTION

The present invention relates to an attachment for a vehicle wheel for enabling driving operation with a flat tire. Independently thereof, the invention additionally provides an emergency wheel and a device for enabling emergency operation properties of a vehicle wheel.

A vehicle wheel means a vehicle wheel of a motor vehicle.

In the present case, axial direction means the direction of the axis of rotation of the vehicle wheel. The radial direction means the direction orthogonal to the axis of rotation of the vehicle wheel. The tire of the vehicle wheel is thus arranged radially outwards when seen from the rim of the vehicle wheel. The bolt circle of the vehicle wheel, for example, is located radially inwards.

The attachment according to the invention for a vehicle wheel for enabling driving operation with a flat tire is configured with a base body which, when seen in an axial direction, is circular or largely annular in shape and is characterized in that the attachment has a positioning device for positioning the attachment on a rim of the vehicle wheel and a fastening device, which is adapted to be actuated independently of the positioning device, for fastening the attachment to the rim of the vehicle wheel. By means of the configuration according to the invention with a positioning device and a fastening device which are adapted to be actuated independently of one another, the attachment according to the invention can be attached very simply and securely to the vehicle wheel with a flat tire.

For mounting the attachment on the vehicle wheel, the attachment is first positioned on the vehicle wheel in the intended position via the positioning device. However, positioning via the positioning device is not sufficient to ensure driving operation but serves merely to correctly place the attachment on the vehicle wheel. Once the attachment has been positioned in the desired position on the vehicle wheel via the positioning device, the attachment is then firmly connected, preferably clamped, to the vehicle wheel via the fastening device. The positioning device advantageously remains unclamped relative to the rim of the vehicle wheel, even when the attachment has finally been fastened to the vehicle wheel. The positioning device is so configured that it permits a centered arrangement of the attachment on the vehicle wheel, wherein the fastening device is adapted to be actuated independently of the positioning device, wherein, by actuating the fastening device, the attachment can be firmly fastened, preferably clamped, to the vehicle wheel.

Preferably, the fastening means of the fastening device are configured as a prefabricated part which is screwed to the attachment.

Preferably, the attachment comprises a locking mechanism which is configured and arranged to lock the fastening means, in particular a pivotably mounted hook element of the fastening means, when it is engaged behind the rim flange, preferably wherein the locking mechanism comprises a preferably biased, in particular spring-biased, catch element. It is preferred if the catch element engages in a locking manner into the hook element, or the hook element engages in a locking manner into the catch element, when the locking mechanism locks the fastening means. The fastening of the attachment to the rim is thus particularly secure. In particular, the catch element can be in the form of a bolt which is biased, in particular via a spring, wherein the pivotably mounted hook element can have, for example, a recess into which the spring-biased bolt engages and locks the hook element when the hook element has been pivoted into the engaged position with the rim. To that end, the recess is advantageously so arranged that, in the engaged position, it pivots over the catch element so that the catch element is able to enter the recess.

Preferably, the fastening means comprises a casing, in particular and is in the form of a prefabricated part, wherein a locking mechanism is preferably also arranged in the casing. The locking mechanism and the fastening means can thus be arranged, in any case partially, in a casing which forms a type of housing for those components. It is preferred if the casing or housing can be assembled individually with the components located therein and then the finished pre-assembled unit can be mounted or is mounted on the attachment as a prefabricated part.

The positioning device can have, for example, pivotable spring-biased claw-type contact elements via which the attachment can be clipped, for example, to the rim, in particular in the region of the rim flange, of the vehicle wheel. Other forms of the contact element and of the positioning device are, however, likewise conceivable. Contact elements of the positioning device can also be arranged in or on fastening means of the fastening device.

The positioning device can be in the form of a grip device, for example, which is configured to be positioned on the vehicle wheel via an interlocking engagement and/or via a friction-based engagement of the grip device with a preferably circular opening in the rim which is arranged in the region of the bolt circle, wherein the opening is arranged in the rim spaced apart from holes which are provided in the rim for receiving wheel bolts or stud bolts, preferably wherein the opening is a center opening of the rim or is spaced apart from an axis of rotation of the rim. Preferably, part of the grip device is in any case connected non-detachably to the attachment, preferably an initial mounting portion, which will be discussed in detail hereinbelow. The attachment, or the initial mounting portion, can thus be fastened particularly simply to the vehicle wheel. In particular, it is advantageous if the opening in the region of the bolt circle is a so-called poly control bore. The attachment, or the initial mounting portion, of the correspondingly configured attachment can be inserted as it were into these openings.

The grip device can comprise, for example, a pin-like element which is expandable in terms of its diameter. The pin-like element can in particular be so configured that, in the fully inserted state, it ends inside the poly control bore, that is to say does not extend completely through the poly control bore.

Preferably, the grip device comprises an expandable portion which is preferably configured to engage behind the opening in the region of the bolt circle and/or the grip device comprises a compressible portion which is configured to be guided through the opening in the region of the bolt circle in the compressed state and to expand into an uncompressed state when it has been guided through the opening. An expandable portion can be, for example, a sleeve which can be spread by the introduction of a spreading element. Such a grip device is advantageously be arranged in the radially inner region of the attachment.

The grip device in the form of the spreadable sleeve can then be introduced, for example, into the poly control bore on mounting of the attachment, in particular of the initial mounting portion, and a spreading element can then be introduced into the spreadable sleeve in order to spread it, so that it engages behind the poly control bore. It is also conceivable that the grip device, as mentioned above, comprises a compressible portion. The compressible portion is compressed on introduction into the poly control bore and then expands independently when it has been guided through the poly control bore and then engages behind it. The variants just described permit simple attachment of the attachment, in particular of the initial mounting portion, for fastening. Mounting of the attachment is facilitated.

"Arranged in the region of the bolt circle" also means in any case that the opening is distinguished from the gaps between the spokes of the rim. Such an opening can in particular be a so-called poly control bore.

The grip device, in particular when it is configured for engagement into the center opening of the rim, can be, for example, in the form of a slotted sleeve. Inside the slotted sleeve there can be arranged an element with a varying radial extent, in particular a cone element, which is movable in the axial direction relative to the slotted sleeve. By the axial movement of the element, the slotted sleeve can be spread, so that it engages in a friction-based manner in the opening, or in the center opening. The element can be movable in the axial direction relative to the spread sleeve via a screw, for example. Slotted sleeve can here also mean a plurality of spreadable arms.

Optionally, the grip device is configured as part of the attachment, in particular of the initial mounting portion. In other words, it can be connected non-detachably to the initial mounting portion.

The grip device can be in the form of a prolongation, in particular a rod-like prolongation, which can comprise a hook region, wherein the prolongation is configured to be introduced into the opening. The hook region can be configured, for example, to be extendable or spreadable so that, when it has been guided through the opening, it is able to engage in an interlocking manner behind the rim.

The hook region can also be configured to be compressible. The hook region can then be reduced in its diameter when it is guided through the opening and expand independently when it has been guided through the openings, so that it is able to engage almost automatically behind the rims. To that end, the hook region can be configured, for example, to be reversibly compressible, resilient and/or spring-mounted.

In one embodiment, the grip device comprises an expandable portion which is configured to engage behind the opening in the region of the bolt circle. Such an expandable portion can be formed, for example, by a hook region which is configured to be spreadable. For example, the grip device can comprise two hook arms which can be moved away from one another and thus spread, for example, by screwing in a spreading element, for example a screw.

The grip device can in particular also be configured in the manner of a hollow pin, wherein it can comprise in the interior a spreading element, in particular a widening pin, which widens the expandable portion by moving in the axial direction. A plurality of grip devices are preferably arranged on the attachment, in particular the initial mounting portion.

If the grip devices are configured, for example, in the manner of hollow pins as just described, the widening pins, or spreading elements, which may be present can be connected together. Preferably, they can additionally be movable jointly in the axial direction, for example by an actuating unit, for example in the form of a screw, in order to widen the expandable portions.

The attachment is preferably so configured that the attachment has a tread portion which comprises a running surface or the tread body of the attachment, and wherein the attachment comprises an initial mounting portion, wherein at least part of the tread portion is configured separately from and detachably connectable to the initial mounting portion or is configured to be movable relative thereto, and wherein the initial mounting portion is arranged radially inward from the running surface when the attachment is fastened to the vehicle wheel.

Preferably, the attachment is so configured that the initial mounting portion and the tread portion, that is to say the part of the attachment comprising the running surface of the attachment, are configured separately and completely detachably from one another. Preferably, the tread portion in turn comprises at least two circumferential segments which are detachable from one another and which can be assembled in such a manner that they form the circular running surface.

Advantageously, the fastening device is configured to engage behind the rim flange of the rim. To that end, the fastening device advantageously has at least one fastening means, preferably a plurality of fastening means, which are configured to engage behind the rim flange of the rim.

However, the fastening means can also be in the form of screws, which can engage through corresponding openings in the base body into corresponding screw receivers on the rim. In this case, the screwing in of these screws constitutes the actuation of the fastening device.

Once the attachment, after using the positioning device, has been placed on the vehicle wheel in the "loose state" achievable by the positioning device, then final fastening to the vehicle wheel takes place via the fastening device. To that end, the fastening device can comprise, for example, claw- or chuck-type fastening means which are configured to engage behind the rim, in particular in the region of the rim flange. These fastening means can then be actuated in order to fasten, preferably clamp, the attachment firmly to the vehicle wheel.

Fastening of the attachment to the vehicle wheel preferably takes place in such a manner that the attachment, on actuation of the fastening device, moves in the axial direction towards the rim. The attachment is thus urged towards the rim to some extent on actuation of the fastening device. Advantageously, fastening via the fastening device thus involves not only clamping in the radial direction but also a displacement of the attachment in the axial direction towards the rim. The attachment, when seen in the axial direction, presses to some extent against the rim. This optional and advantageous aspect of the fastening of the attachment will be discussed in detail hereinbelow.

Advantageously, the surface of the attachment has a resilient surface, formed, for example, by a rubber coating, in the region provided for contacting with the rim.

The base body is preferably produced using steel. Other materials are, however, likewise conceivable. The statement regarding the shape of the base body (the base body, when seen in the axial direction, is circular or largely annular in shape) relates to its state when the attachment is mounted on the vehicle wheel in its configuration intended for driving operation. For example, the base body can comprise a plurality of individual parts, each of which is no longer circular or annular in shape, the base body can be disassembled into these individual parts, and/or these individual parts can be pivotably connected to one another. This will be discussed in detail hereinbelow.

The attachment according to the invention represents a compact alternative to a spare wheel.

The positioning device comprises preferably at least two contact elements which are preferably distributed evenly on the base body in the circumferential direction and which can each be fixed in at least one specified fixing position, preferably a plurality of specified fixing positions, which correspond(s) to a standardized rim flange diameter, in order to position the attachment in a centered manner on a corresponding rim with a standardized rim flange diameter.

For example, the positioning device can comprise at least two contact elements which are displaceable between respective fixing positions for standardized rim flange diameters for 18, 19 and 20 inch rims. The contact elements of the positioning device can be locked in each of the fixing positions associated with the corresponding rim flange diameters, so that the attachment can then be mounted or clipped in a simple manner on a rim with the corresponding diameter.

For example, the contact elements, in order to be movable into the individual fixing positions, can be displaceable in the radial direction and can be capable of being pushed in the circumferential direction into locking slots which correspond to the fixing positions. When the contact elements have been pushed into the locking slots, they are fixed in the radial direction against displacement. However, in order to allow the attachment to be mounted or clipped easily on the vehicle wheel, the contact elements can be pivotable in the radial direction in their state pushed into the respective locking slot.

It is advantageous if the contact elements are spring-biased radially inwards, so that they are able to grip the rim of the vehicle wheel almost independently and center the attachment relative to the rim by the spring bias.

It is preferred if the fastening device comprises at least one pressure measuring device which is configured to detect a clamping of the fastening device against the rim, preferably against the rim flange. For example, the fastening device can comprise a pressure sensor via which a pressure with which the fastening device clamps the attachment against the rim can be measured.

The fastening device can comprise fastening means having a pressure sensor. Such a pressure sensor is configured to detect a pressure with which the respective fastening means rests on the rim or the rim flange. By means of the signals of the pressure sensors or of the pressure sensor, the force with which the fastening device is clamped against the rim can then be determined.

In a preferred embodiment, the attachment comprises, in addition to the pressure measuring device, also a signal device which is configured and adapted to transmit a signal when the clamping of the attachment relative to the rim is sufficient. The signal device is configured to transmit a signal when the attachment is fastened to the rim with sufficient clamping, or sufficiently securely.

The signal device can additionally or alternatively also be adapted and configured to transmit a signal when the attachment is correctly or incorrectly positioned via the positioning device.

It is also preferred if the fastening device comprises at least one detachable fastening means, optionally a plurality of detachable fastening means, and/or at least one fastening means, optionally a plurality of fastening means, which is mounted or can be mounted so as to be movable, in particular displaceable, in the radial direction. The fastening means can be capable of being detachably mounted on the attachment, for example by means of holding lugs, in different positions which are associated with the different fixing positions of the contact elements of the positioning device, that is to say are adapted to different rim diameters. A smooth displaceable mounting of the fastening means is also conceivable, wherein the fastening means can preferably be locked in specific positions and can be clamped in those positions separately relative to the rim. For example, the fastening means can be displaceable manually along a guide and thus roughly adjustable to a rim diameter. Preferably, the fastening means can thereby be locked in designated positions. In this locked state, the fastening means can then be clamped against the rim over short distances by means of a corresponding tool, for example a hexagon socket, or also without a tool, for example by pivoting or displacement over a short distance in the radial direction.

It is also preferred if the fastening device comprises a coupling mechanism which couples a movement of at least two movable fastening means, preferably a plurality, in particular all, of the movable fastening means on clamping of the fastening device in the radial direction and/or in the axial direction, preferably wherein the coupling mechanism is so configured that the movement of the coupled movable fastening means is uniform and/or in the same direction. To that end, a plurality of fastening means, for example, can be capable of being clamped inwards via a clamping ring. The clamping ring can have, for example, a reducible diameter, wherein the clamping ring is so arranged and configured that, on reduction of the diameter of the clamping ring, the coupled fastening means are pivotable radially inwards and can be clamped against the rim.

Alternatively, the clamping ring can be configured to be rotatable in the circumferential direction. By rotation of the clamping ring, it can be movable in the axial direction, for example along a thread. In the case of a movement of such a clamping ring directed towards the rim, the fastening means can, for example, be so configured and arranged that the clamping ring, as it moves axially towards the rim, can contact bevelled surfaces of the fastening means, whereby the fastening means can be pivotable and/or displaceable radially inwards. By rotation of such a clamping ring in the circumferential direction, the fastening device can thus be actuated. The fastening means of the fastening device are clamped relative to the rim simultaneously and uniformly during this actuation, for example by being pivoted radially inwards.

It is also preferred if the coupling mechanism comprises a clamping element which connects at least two fastening means together or via which at least two fastening means can be connected together, wherein the clamping element is so configured that it can be shortened in its extent in the radial direction. For example, such a clamping element can be in rod-like or also cross-like form. With its two ends, the clamping element can be capable of being connected, for example hooked, to two opposing fastening means of the fastening device.

The clamping element can have, for example, a middle part with opposing threads. The ends which can be fastened to the fastening means can be screwed into the opposing threads. By means of a relative rotation of the middle part relative to the ends, the ends are screwed either into the middle part or out of the middle part, whereby the clamping element is either lengthened or shortened in the radial direction. The fastening means can be movable towards one another by the shortening of the clamping element, whereby actuation of the fastening device or clamping of the fastening means relative to the rim can be achieved. The fastening means can also be pivotable radially inwards by lengthening the clamping element, whereby actuation of the fastening device or clamping of the fastening means relative to the rim can be achieved.

It is also advantageous if the fastening means are spring mounted or mountable relative to the base body, for example relative to holding lugs or other devices for fastening the fastening means. Likewise or alternatively, the holding lugs or other devices for fastening the fastening means can be spring mounted relative to the base body.

In order to produce the coupling mechanism, it is also conceivable that the individual fastening means are connected together, for example, via a type of rigid tension belt system, the tension belt can thereby be shortened in its circumferential extent.

Also conceivable is a coupling mechanism via, for example, pneumatic or hydraulic actuation of the fastening device. For example, the fastening means can be subjected to pressure and thereby actuatable via common lines.

In an advantageous variant, both the fastening device and the positioning device are pneumatically or hydraulically actuatable, for example via a respective actuating device. Preferably, the fastening device as well as the positioning device can to that end be connected via corresponding connections to a pressure medium source or has a pressure medium source. A pressure medium source can be, for example, a tire or a compressor or another pressure accumulator or pressure generator located in or on the vehicle.

The fastening means can, for example, also be connected together via a type of toothed wheel system, in order to produce the above-mentioned coupling mechanism.

Generally, that is to say in all the embodiments of the coupling mechanism, it is preferred if not only the radial movement of the individual fastening means is coupled via the coupling mechanism but, either alternatively or in addition, also an axial movement of the fastening means is coupled via the coupling mechanism, for example in one of the ways described above.

It is also advantageous if the fastening device, preferably at least one of the fastening means, preferably a plurality, in particular all, of the fastening means comprise a hook portion which is configured to engage behind a portion, in particular a rim flange, of the rim of the vehicle wheel. Via such a hook portion, the attachment can advantageously be securely mounted on the rim of the vehicle wheel. A hook portion means a portion which is so configured that it is able to engage in an interlocking manner behind the portion of the rim, preferably the rim flange of the rim. A preferred embodiment is characterized in that the fastening device, preferably on a plurality of fastening means distributed around the circumference, has a plurality of such hook portions distributed around the circumference, which can each engage in an interlocking manner behind the rim flange of the rim.

It is also advantageous if the fastening device comprises a contact portion, which is preferably arranged on the hook portion, wherein the contact portion comprises a resilient, elastic surface, for example formed by a coating, for preventing damage to the portion of the rim, in particular the rim flange. The contact portion means the portion of the fastening device which, when the attachment is mounted as intended on the vehicle wheel, or on the rim of the vehicle wheel, contacts the rim, in particular the rim flange. By means of the described resilient elastic coating or surface, which can be implemented, for example, by a rubber coating, damage to the rim, or the rim flange, is reliably avoided.

It is also advantageous if the contact portion, in particular the hook portion, is curved in the circumferential direction in order to conform to the rim flange. To that end, the hook portions or the contact portion, for example, of the fastening device can be elongate and curved in the circumferential direction according to the circumferential curve of the rim flange. The curve of the contact portions need only correspond substantially to the curve of the rim, in particular if the resilient elastic coating is present.

It is also advantageous if the fastening device is so configured that it contacts the rim, in particular the rim flange, over at least a sixth, preferably a quarter, preferably a third, preferably half, of its circumferential extent, when the attachment is mounted on the vehicle wheel. This is possible, for example, as a result of the above-mentioned hook portions or contact portions which are curved in the circumferential direction. For example, in this embodiment the contact portions and/or the hook portions can thus rest on the rim flange over a sixth of the circumferential extent thereof.

It is also advantageous if the fastening device, preferably the contact portion, preferably the fastening means, in particular the hook portion thereof, is so configured that the attachment, on fastening to the rim of the vehicle wheel, is urged in the axial direction towards the rim. The attachment thus pulls itself in the direction of the rim on fastening to the vehicle wheel. This can be achieved, for example, via the axial movability of the fastening means. For example, a radial inward movement of the fastening means can be forcibly coupled with an axial movement.

It is also advantageous if the fastening device, in particular the contact portion or the hook portion, comprises a clamping surface which, when seen in the axial direction, slopes radially inwards, preferably in a linear or arcuate manner, wherein the fastening device is so configured that the clamping surface, on fastening of the attachment to the rim of the vehicle wheel, moves, in particular is displaced, radially inwards, and the clamping surface is so configured that the attachment, on fastening to the rim of the vehicle wheel, is urged in the axial direction towards the rim. By means of the clamping surface, which is configured as described above, a movement of the clamping surface, for example by movement of the fastening means, radially inwards at the same time causes a movement which forces the attachment in the direction of the rim of the vehicle wheel. In such a form, the attachment, on fastening, is thus urged towards the vehicle wheel and ensures a secure and firm hold.

It is also advantageous if the base body comprises a rim-side part and a part facing away from the rim which is detachable from the rim-side part. The base body can thereby be separable into the above-mentioned two parts, for example, along a plane running orthogonally to the axial direction. On the one hand, the attachment can thus be handled more flexibly and, on the other hand, advantages are thus obtained in terms of mounting of the attachment.

It is also advantageous if the base body, or optionally each of the rim-side part and the part facing away from the rim, comprises at least two circumferential segments. In this embodiment, the base body, or the respective parts, are thus divided in the circumferential direction into individual segments. Mounting and handling of the attachment are thereby improved.

It is also advantageous if the circumferential segments are connected together in the circumferential direction preferably detachably, in particular via a preferably detachable folding mechanism or an engagement structure. Via a folding mechanism, for example, the attachment, when it is not required, can be folded and stored. If the individual segments are configured to be detachable from one another, then the attachment can be disassembled into individual parts and stored in a space-saving manner. The embodiment variant with the segments additionally offers the possibility of first connecting individual segments together and then mounting those connected segments on the vehicle wheel. After mounting of those connected segments, the vehicle wheel can be turned and a further segment or a plurality of further segments can be inserted, or pivoted in, in order to complete the attachment on the vehicle wheel. It can thus be possible, for example, to mount the attachment without removing the vehicle wheel from the vehicle.

In a preferred embodiment, the circumferential segments each have an extendable element which can be pushed into an adjacent circumferential segment into a corresponding receiver, whereby the two circumferential segments are rigidly connectable together.

It is also advantageous if the rim-side part and the part facing away from the rim, or a segment of each of the rim-side part and the part facing away from the rim, form in the assembled state a receiving portion into which, on assembly into the assembled state, a tread body, or a segment of a tread body, can be inserted in such a manner that it is held in an interlocking manner, in particular via interlocking engagement. A tread body means an element which is configured to form a running surface of the attachment, that is to say the contact surface with the road.

Preferably, the tread body is formed of an elastic rubber material or polymer material. The interlocking holding, or the interlocking engagement, of the tread body can be achieved by a dovetail-shaped channel which is formed between the two parts, wherein the tread body has a corresponding portion having a complementary shape to that channel, which can be received in an interlocking manner in the channel. Such a channel is a form of a receiving portion.

It is also advantageous if the tread body is in shock-absorbing form, preferably wherein the tread body is formed of an elastically resilient material and/or has an elastically resilient structure, in particular a structure comprising voids and/or holes. The tread body can thus cushion unevenness of the driving surface. However, an air-filled tread body similar to a tire is also conceivable. A tread body of a polymer material with openings running substantially in the axial direction, which lead to an elastically damping property of the tread body, is conceivable. However, other structures of the tread body which lead to the resilient properties are also conceivable, in particular voids, which can be closed or open, in the tread body are conceivable for this purpose.

The tread body can comprise voids to each of which compressed air or a pressure medium can be applied individually, for example via separate valves or via separate feed lines present in the attachment. By applying a pressure medium to the voids, the cushioning of the tread body can be adjusted individually as required or according to the desired cushioning.

It can be advantageous if the base body has openings. These openings can serve on the one hand to reduce the weight of the base body and thus of the attachment. On the other hand, these openings can serve to make the attachment readily foldable or collapsible. In the folded or collapsed state, preferably at least one element protruding from the surface of the base body, such as, for example, the fastening device or part of the fastening device, can project into such an opening.

The tread body can advantageously be so configured that it has an extent in the axial direction which corresponds at least to the extent of the base body in the axial direction, but in particular exceeds that extent. In other words, the tread body, when seen in the axial direction, can be thicker than or at least equally as thick as the base body.

It is also advantageous if a radially outer running surface of the attachment extends in the direction of the vehicle wheel, when seen in the axial direction, into a rim mouth of the rim, when the attachment is fastened to the rim of the vehicle wheel.

Moreover, it is advantageous if the attachment, or the radially outer running surface thereof, extends in the direction of the vehicle wheel, when seen in the axial direction, to the middle of the rim. In these embodiments, the running surface of the attachment thus partially covers the tires. For example, the attachment can thereby serve as a snow chain substitute. Such a form of the attachment with a correspondingly wide running surface also improves the grip when driving round curves.

It is also advantageous if the attachment comprises an additional fastening element which is configured to fasten the attachment to the rim in the region of the bolt circle, in particular at the bolt circle and/or at the central opening, of the rim and/or at a spoke of the rim. Such an additional fastening element can, for example, be in the form of an arm-like widening towards the bolt circle. The security of the fastening of the attachment is thereby increased.

It is also advantageous if the additional fastening element is fastened detachably or non-detachably to the attachment, preferably wherein the fastening of the additional fastening element is such that the additional fastening element is movable, preferably displaceable and/or pivotable, relative to the attachment. In the case of the detachable additional fastening element, the additional fastening element can be fitted, for example, at the start of mounting, and then the fastening device can be clamped tightly and the additional fastening element then detached. In the case of a displaceable additional fastening element, this can, for example, be pushed out and used for mounting the attachment and pushed in when mounting is complete.

The present application also provides a device for enabling emergency operation properties of a vehicle wheel, which device is characterized in that the device comprises a first support element, which is configured to be mounted on the vehicle wheel on the vehicle side, and a second support element, which is configured to be mounted on the vehicle wheel on the outer side facing away from the vehicle, wherein the support elements are so configured that, in an intended mounting position on the vehicle wheel, they apply pressure laterally to the side walls of the tire of the vehicle wheel in such a manner that a running surface of the tire is urged radially outwards. The support elements thus support the tire laterally in such a manner that, despite there being insufficient air pressure, it is nevertheless able to form a tread body of the vehicle wheel and provides a sufficient running surface.

Advantageously, in such a device, the first support element and the second support element each have clamping arms for fastening the support elements to the rim of the vehicle wheel, wherein the clamping arms are so configured and are so arranged in the intended mounting position that they engage between a tire bead of the tire and a rim well of the rim in such a manner that they lift the tire bead from the rim well. The tire is thus used particularly efficiently as a tread body despite there being insufficient air pressure in the tire.

Advantageously, a device as described above comprises a fastening mechanism which is so configured that, on fastening of the device to the vehicle wheel by means of the fastening mechanism, the first support element and the second support element can be clamped against the rim in such a manner that they move towards the rim until they come into contact therewith. To that end, the device can comprise a fastening mechanism which corresponds to the fastening device of the attachment as described above.

The present application also provides an emergency wheel having a base body which can be fastened to a bolt circle of a wheel hub in place of a defective vehicle wheel and, when seen in an axial direction, is circular or largely annular in shape, wherein the emergency wheel is characterized in that the base body comprises at least two circumferential segments.

Advantageously, the circumferential segments are detachably connected together. This detachable connection can be achieved via a folding mechanism or an engagement structure.

The folding mechanism can also be non-detachable.

The engagement structure for the detachable connection of the circumferential segments can comprise a dovetail-shaped prolongation on one of the segments and a corresponding recess on a further of the segments. On connection of the circumferential segments, the dovetail-shaped prolongation is inserted into the corresponding recess on the other segment and the two circumferential segments are, for example, screwed together in order to produce a secure connection between the circumferential segments.

Further features, possible applications and advantages of the invention will become apparent from the following description of exemplary embodiments of the invention, which are explained with reference to the drawing, wherein the features can be fundamental to the invention both in isolation and in different combinations, without explicit reference being made thereto again.

BRIEF DESCRIPTION OF THE DRAWINGS

In the drawings:

FIG. 1 shows a first embodiment of an attachment according to the invention;

FIGS. 2A-2C show, schematically, a fastening means;

FIG. 7 shows an alternative embodiment of the attachment;

FIGS. 8A and 8B show, schematically, an alternative fastening means;

FIG. 9 shows an alternative embodiment of the attachment;

FIG. 10 shows a coupling mechanism;

FIGS. 25A-25C showsan alternative embodiment of the attachment; and

DESCRIPTION OF THE ILLUSTRATIVE EMBODIMENTS

Figure 3:
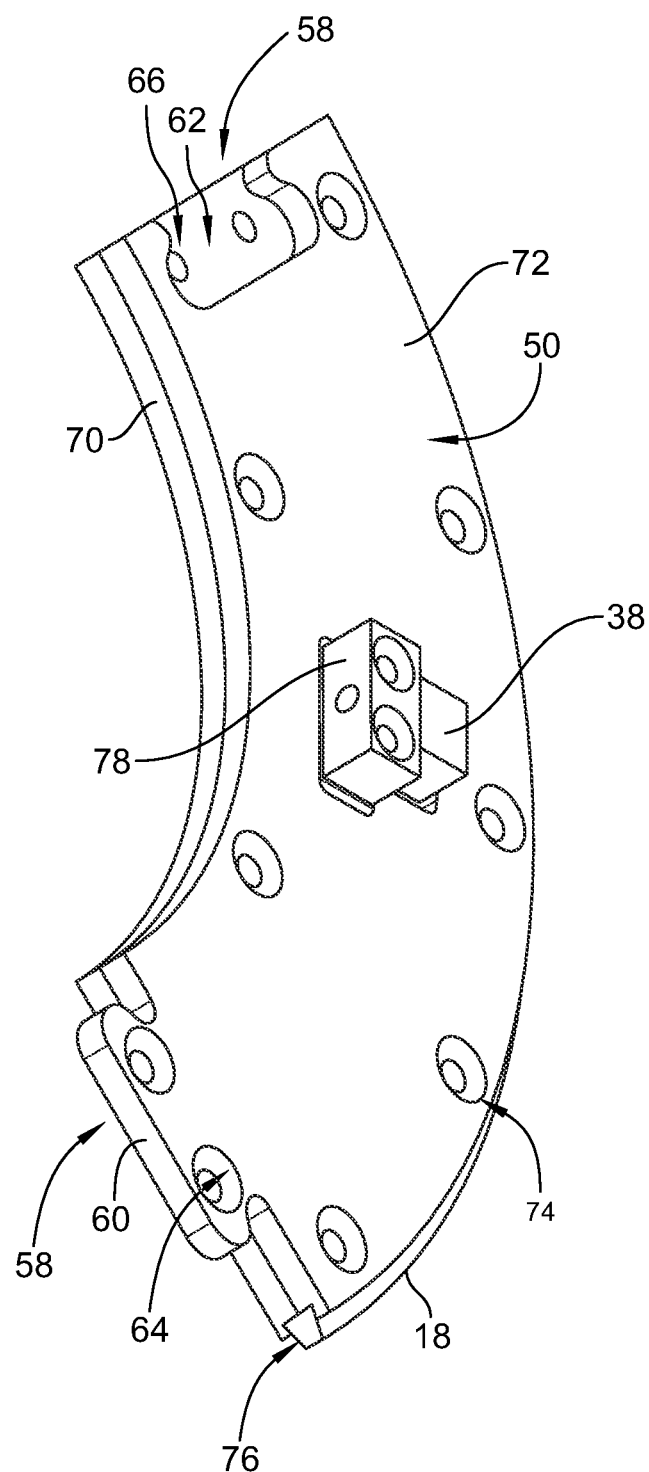
FIG. 3 shows a circumferential segment of an alternative embodiment of the attachment.

In the following figures, corresponding components and elements carry the same reference numerals. For the sake of clarity, not all reference numerals are repeated in all figures.

FIG. 1 shows, in a schematic representation, an attachment 10 for a vehicle wheel 12, not shown in FIG. 1, for enabling driving operation with a flat tire 14.

The attachment 10 comprises a tread body 18, a base body 20, a positioning device 22 and a fastening device 24.

The tread body 18 serves for contacting the attachment 10 with the road when the attachment 10 is fastened to the vehicle wheel 12.

The positioning device 22 serves to position the attachment 10 on a rim 26 of the vehicle wheel 12.

The fastening device 24 serves to fasten the attachment 10 to the rim 26 of the vehicle wheel 12, wherein the fastening device 24 can be actuated independently of the positioning device 22.

In the embodiment according to FIG. 1, the positioning device 22 comprises at least two contact elements 32. Preferably, the contact elements 32 are distributed uniformly on the base body 20 in a circumferential direction 30.

It is advantageous if the contact elements 32 can be fixed in the radial direction 34, as shown in FIG. 1, in a plurality of specified fixing positions FP1, FP2 and FP3, which correspond to a standardized rim flange diameter. The attachment 10 can thus be positioned in a centered manner via the positioning device 22, or the contact elements 32 thereof, on a corresponding rim 26 with a standardized rim flange diameter.

The positioning device 22 can have, for example, pivotable spring-biased claw-type contact elements 32 (see, for example, FIGS. 12 to 18), via which the attachment 10 can to a certain extent be clipped to the rim 26, in particular in the region of a rim flange 13, of the vehicle wheel 12. Other forms of the contact elements 32 or of the positioning device 22 as a whole are, however, likewise conceivable. Advantageously, the positioning device 22 is configured to be self-centering, which means that, even if the attachment 10 has not been positioned centrally on the vehicle wheel 12, the positioning device 22 moves the attachment 10 into a centered position relative to the vehicle wheel 12. This can be achieved, for example, by spring biasing the contact elements 32.

The contact elements 32 of the positioning device 22 can also be arranged in or on fastening means 38 of the fastening device 24.

The fastening device 24 within the meaning of the present invention can be actuated independently of the positioning device 22. Actuate means that the fastening device 24 is operated in such a manner that the attachment 10 is firmly connected to the vehicle wheel 12 via the fastening device 24. To that end, the fastening device 24 can comprise, for example, claw- or chuck-type fastening means 38. The fastening means 38 are generally configured to engage behind the rim 26, in particular in the region of the rim flange 13.

On actuation of the fastening device 24, the fastening means 38 then engage behind the rim flange 13 and clamp the attachment 10 against the rim 26. This can be achieved, for example, by displacing or by pivoting the fastening means 38 in the radial direction 34.

Actuation of the fastening device 24 can be possible via a corresponding tool or also without a tool. For example, the fastening means 38 can be configured to be movable by means of a hexagon socket. Also conceivable is a handle, by means of which the fastening means 38 are movable. The movement can comprise a translational movement or also a pivoting.

Such a claw-type fastening means 38 is shown schematically in different positions, for example, in FIGS. 2A-2C, which show a sectional representation along the line II-II. FIGS. 2A-2C show a form of the fastening means 38 in which the fastening means 38 are displaceable both in the radial direction 34 and in the axial direction 48.

The fastening device 34 can comprise a pressure measuring device 40. Preferably, such a pressure measuring device 40 is arranged on one or more of the fastening means 38. Such a pressure measuring device 40 is configured to detect the clamping of the fastening device 24 against the rim 26 or the rim flange 13. That is to say, for example, the force with which the fastening means 38 press against the rim flange 13 or are in contact therewith.

In a preferred embodiment, the attachment 10 comprises a signal device 44 which is configured to transmit a signal when the clamping of the attachment 10 relative to the rim 26 is sufficient for safe driving operation. That is to say when the attachment 10 is fastened sufficiently firmly to the rim 26. Advantageously, the signal device 44 is coupled with the pressure measuring device 40 for this purpose. The signal device 44 can be configured to transmit visual, acoustic or haptic signals.

The fastening means 38 can also be in the form of screws which can engage through corresponding openings in the base body 20 into corresponding screw receivers on the rim 26. Such an embodiment is shown in FIGS. 19 to 22.

However, it is preferred if the fastening means 38 are configured to engage behind the rim flange 13 of the rim 26.

The base body 20, when seen in an axial direction 28, is circular or largely annular in shape (see, for example, FIG. 1). This means that the base body 20 in its assembled state, as is shown, for example, in FIG. 1, in which it is also mounted on the vehicle wheel 12 in driving operation, has the shape just mentioned.

Fastening of the attachment 10 to the vehicle wheel 12 on actuation of the fastening device 24 preferably takes place in such a manner that, on actuation of the fastening device 24, the attachment 10 moves in the axial direction 48 towards the rim 26. The attachment 10 is thus urged to some extent towards the rim 26 on actuation of the fastening device 24. Advantageously, fastening via the fastening device 24 thus involves not only clamping in the radial direction but also a displacement of the attachment 10 in the axial direction towards the rim 26. The attachment 10 thus presses to some extent, when seen in the axial direction 48, against the rim 26. This optional advantageous aspect of the fastening of the attachment 10 will be discussed in detail hereinbelow.

Advantageously, the surface of the attachment 10 has a resilient surface, implemented, for example, by a rubber coating, in the region in which it comes into contact with the rim 26.

For mounting the attachment 10 on the vehicle wheel 12, the attachment 10 is first positioned on the vehicle wheel 12 in the intended position via the positioning device 22. In the example of the attachment 10 shown in FIG. 1, this positioning takes place via the contact elements 32, which have previously been adjusted to the appropriate rim diameter of the vehicle wheel 12, for example by being locked in the corresponding position FP 2. In the present example, the attachment 10 is as it were clipped onto the rim 26 via the contact elements 32. The contact elements 32 are for that purpose mounted in a pivotable and spring-biased manner. On positioning of the attachment 10 on the rim 26, the attachment 10 is as it were placed on the rim 26 or held thereon and then pressed onto the rim 26, wherein the contact elements 32 widen against their spring bias and then, on account of the spring bias, snap into engagement behind the rim flange 13. The attachment 10 is then positioned in a centered manner relative to the rim 26. This positioning of the attachment 10 does not provide sufficient hold for driving operation, however.

Following the positioning of the attachment 10 on the vehicle wheel 12 by means of the positioning device 22, the attachment 10 is fastened to the vehicle wheel 12 via the fastening device 24. To that end, the fastening device 24 is actuated. In the example shown in FIG. 1, the fastening means 38 are displaced towards the rim flange 13 so that they engage behind it. The fastening means 38 are then clamped against the rim flange 13, so that the attachment 10 is firmly fastened to the rim flange 13, or to the rim.

In other words, positioning via the positioning device 22 is not sufficient to ensure driving operation but serves merely to place the attachment 10 correctly on the vehicle wheel 12.

Once the attachment 10 has been positioned on the vehicle wheel 12 in the desired position via the positioning device 22, the attachment 10 is then firmly connected, preferably clamped, to the vehicle wheel 12 via the fastening device 24.

The positioning device 22 advantageously remains unclamped relative to the rim 26 of the vehicle wheel 12, even when the attachment 10 is finally fastened to the vehicle wheel 12.

Advantageously, the base body 20 of the attachment 10 is composed of a plurality of circumferential segments 50. In the example of FIG. 1, the two circumferential segments 50 are connected together via hinges 54, which form a folding mechanism. The hinges 54 can be detachable or non-detachable.

Instead of or in addition to the hinges 54, an engagement structure 58 can also be provided for connecting the circumferential segments 50.

A circumferential segment 50 which can be connected via such an engagement structure 58 to further, similar circumferential segments 50 is shown, for example, in FIG. 3. The engagement structure 58 comprises a dovetail-shaped prolongation 60 which can be inserted into a corresponding recess 62.

Connecting screws can be inserted into the dovetail-shaped prolongation 60 via screw holes 64 and screwed into screw receivers 66 in the region of the recess 62. The circumferential segments connected together via the engagement structure 58 are then firmly connected together.

It can clearly be seen on the circumferential segment 50 shown in FIG. 3 that it comprises a rim-side part 70 and a part 72 facing away from the rim. The two parts 70, 72 can be detached from one another and firmly connected together via a corresponding screw connection 74.

When the two parts 70, 72 are detached from one another, the tread body 18 can be inserted into a corresponding channel 76 between the two parts 70, 72; when the two parts 70, 72 are firmly connected together via the screw connections 74, the tread body 18 is held in the channel 76 in a loss-proof manner via a corresponding engagement. The channel 76 is an example of a receiving portion.

In the circumferential segment 50 shown in FIG. 3, the fastening means 38 shown is displaceably attached to a holding lug 78.

Figure 4:
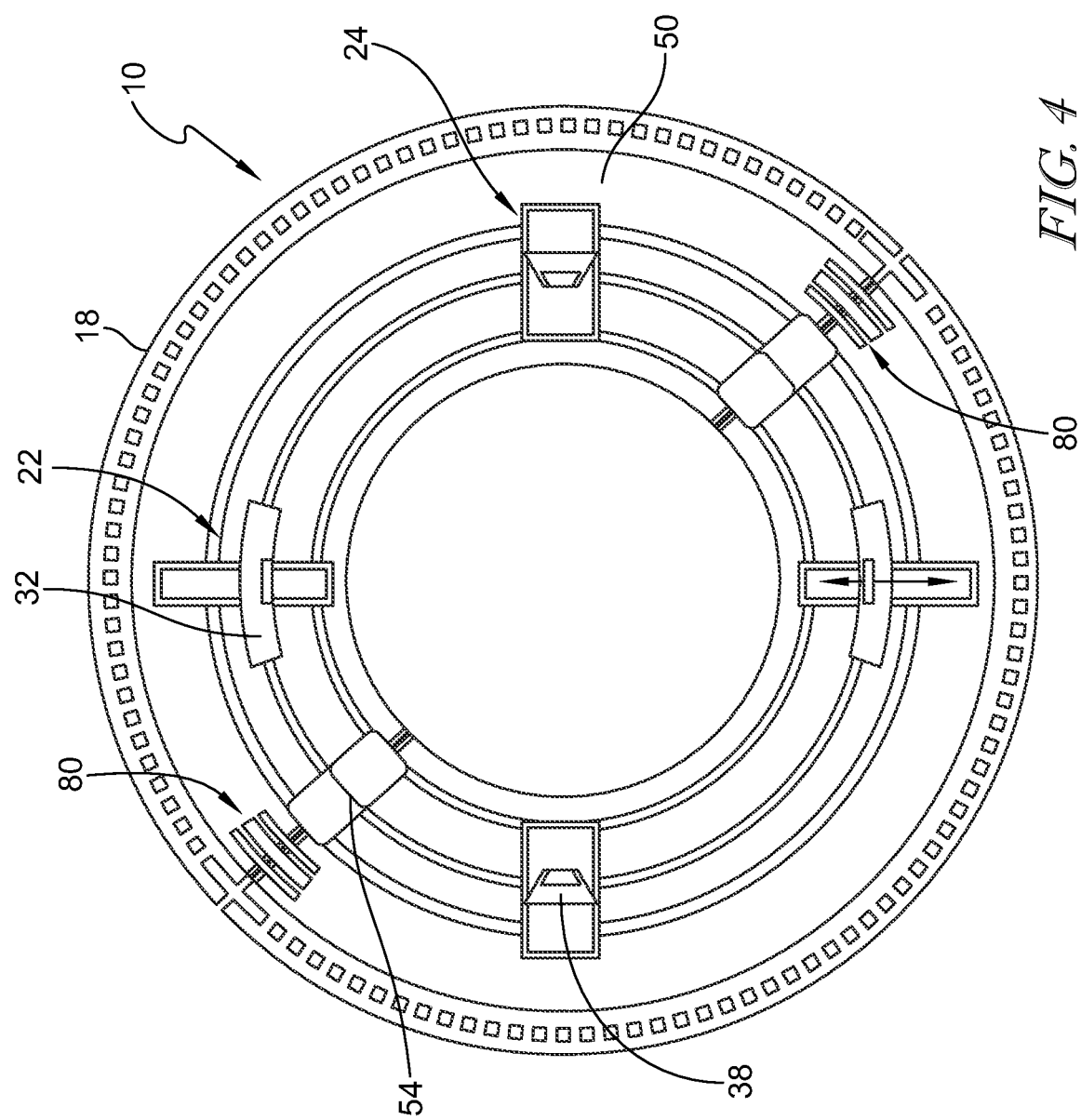
FIG. 4 shows an alternative embodiment of the attachment.

The attachment 10 shown in FIG. 4 is similar in construction to the attachment of FIG. 1. However, the attachment of FIG. 4 has locking devices 80, via which the circumferential segments 50 can be locked together in the folded state so that the attachment 10 can no longer be folded until the locking devices 80 have been released.

Figure 5:
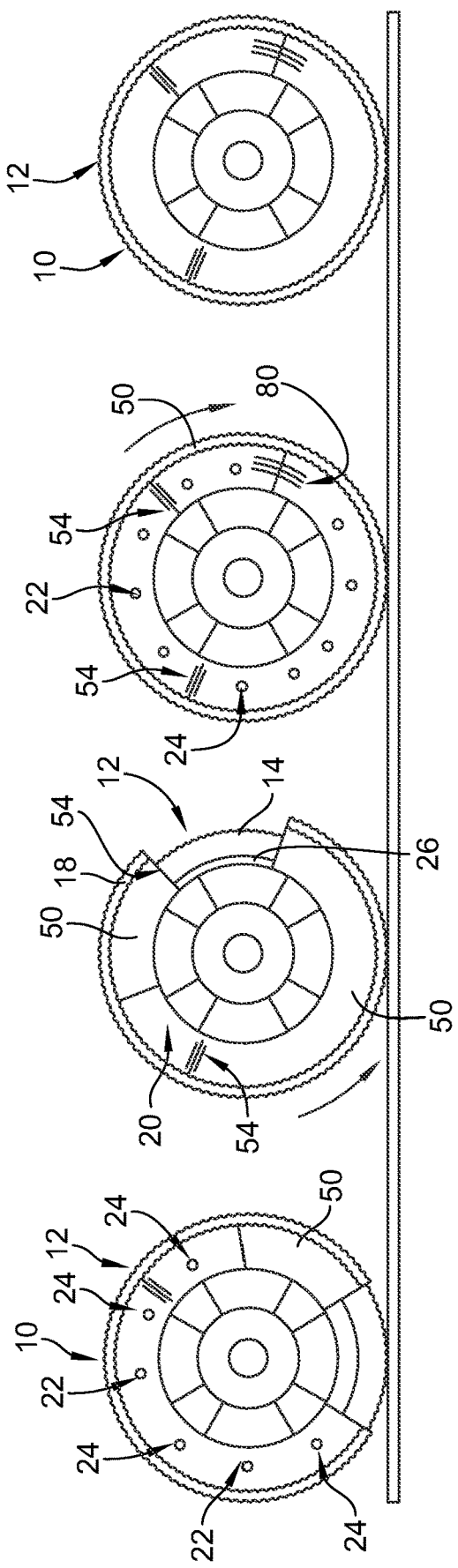
FIG. 5 shows a mounting process of an alternative attachment.

FIG. 5 shows how an embodiment of the attachment 10 can be mounted on a vehicle wheel 12 without the vehicle wheel 12 being removed from the motor vehicle.

First, the attachment 10 is positioned on the vehicle wheel 12 via the positioning device 22. A circumferential segment 50, which carries a corresponding reference numeral in FIG. 5, thereby remains in the folded-in state.

The attachment 10 is then firmly fastened to the vehicle wheel 12 via the fastening device 24.

Positioning via the positioning device 22 and fastening via the fastening device 24 thereby take place as described above.

After fastening of the attachment 10, the vehicle wheel is moved forwards by 90°.

The folded-in circumferential segment 50 is then folded out and locked via the locking devices 80.

The parts of the fastening device 24 arranged on the circumferential segment 50 that was initially folded in are then likewise clamped or actuated.

Fastening of the attachment 10 is then complete and driving operation can be resumed.

Figure 6:
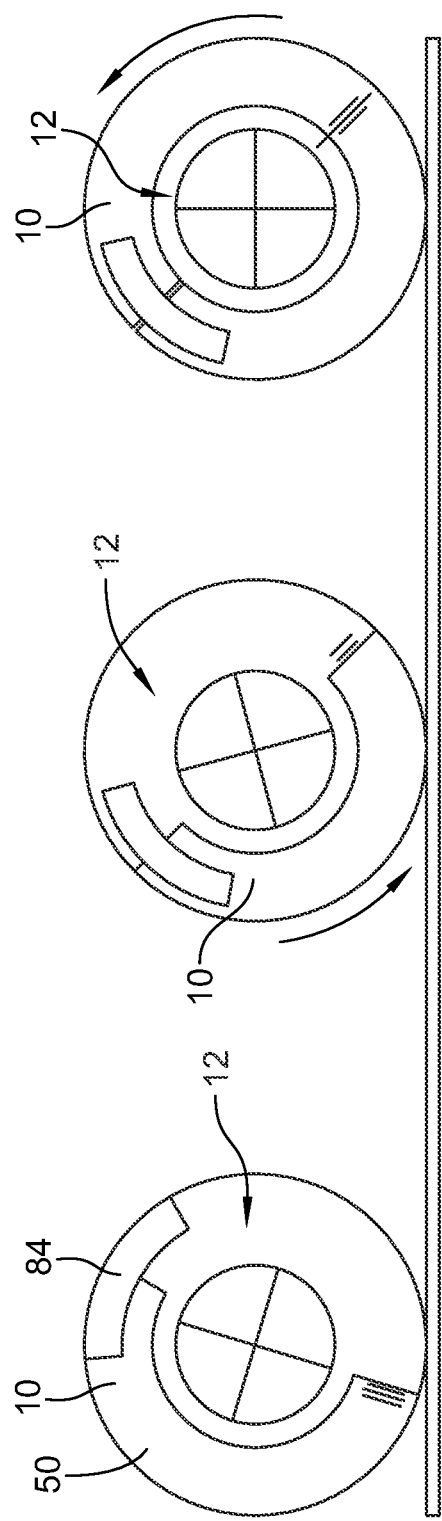
FIG. 6 shows a further mounting process of an alternative attachment.

FIG. 6 shows the mounting of a further embodiment, wherein in the embodiment shown in FIG. 6 one of the circumferential segments 50 has an extendable mounting aid 84. Via the mounting 84, the circumferential segment 50 fastened first to the vehicle wheel can be clamped against the vehicle wheel 12.

FIG. 7 shows an embodiment of the attachment 10 with a coupling mechanism 90 which couples movable fastening means 38.

It is preferred if the fastening device 24 comprises a coupling mechanism 90 which couples a movement of at least two movable fastening means 38, preferably of all the movable fastening means 38, on actuation of the fastening device 24.

Wherein the coupling of the movements can couple the movement in the radial direction 34 and/or in the axial direction 48.

Preferably, the coupling mechanism 90 is so configured that the movement of the coupled movable fastening means 38 is uniform, that is to say with the same speed, and in the same direction.

The embodiment of the coupling mechanism 90 shown in FIG. 7 comprises a clamping ring 92 having a handle 94. The clamping ring 92 is configured to be rotatable in the circumferential direction.

By rotating the clamping ring 92, it can be movable in the axial direction 48 along a thread 96 which is arranged on corresponding fastening lugs 97, as illustrated in FIG. 7. The clamping ring 92 is a possible embodiment of a clamping element 93; a similar mechanism can be implemented via a slider 98 which is movable in the radial direction, as shown in FIGS. 8A and 8B.

In the case of a movement of the clamping ring 92 of FIG. 7 towards the rim 26, the fastening means 38 can be so configured and arranged, for example, that the clamping ring 92, on moving axially towards the rim 26, is able to come into contact with bevelled surfaces 100 of the fastening means 38, whereby the fastening means 38 can be pivotable and/or displaceable radially inwards. A similar function is possible via the slider 98.

By rotating such a clamping ring 92 of FIG. 7 in the circumferential direction 30, the fastening device 24 can thus be actuated. During this actuation, the fastening means 38 of the fastening device 24 are clamped relative to the rim 26 simultaneously and uniformly, for example by pivoting radially inwards. To that end, the fastening means 38 are preferably pivotably mounted on the attachment 10 via a link 104.

It is also preferred if the coupling mechanism 90 comprises a clamping element 106 which connects together at least two fastening means 38 or via which at least two fastening means 38 can be connected together, wherein the clamping element 106 is configured so that it can be shortened in its extent in the radial direction 34. A corresponding embodiment is shown in FIG. 9.

For example, such a clamping element 106 can be in rod-like form. However, a cross-like form is also conceivable (FIG. 10). With its two ends 110, the clamping element 106 can be connected, for example hooked, to two opposing fastening means 38 of the fastening device 24 (see FIG. 9).

The rod-like clamping element can have, for example, a middle part 112 with opposing threads 114, 116. The ends 110 which can be fastened to the fastening means 38 can be screwed into the opposing threads 114, 116. By rotating the middle part 112, the ends 110 are screwed either into the middle part 112 or out of the middle part, whereby the rod-like clamping element 106 is either lengthened or shortened.

The fastening means 38 can be moved towards one another by the shortening of the clamping element 106, whereby actuation of the fastening device 24, or clamping of the fastening means 38 relative to the rim 26, can be achieved.

Alternatively, the fastening means 38 can also be pivotable radially inwards by lengthening the clamping element 106, whereby actuation of the clamping device 24, or clamping of the fastening means 38 relative to the rim 26, can likewise be achieved.

Figure 11:
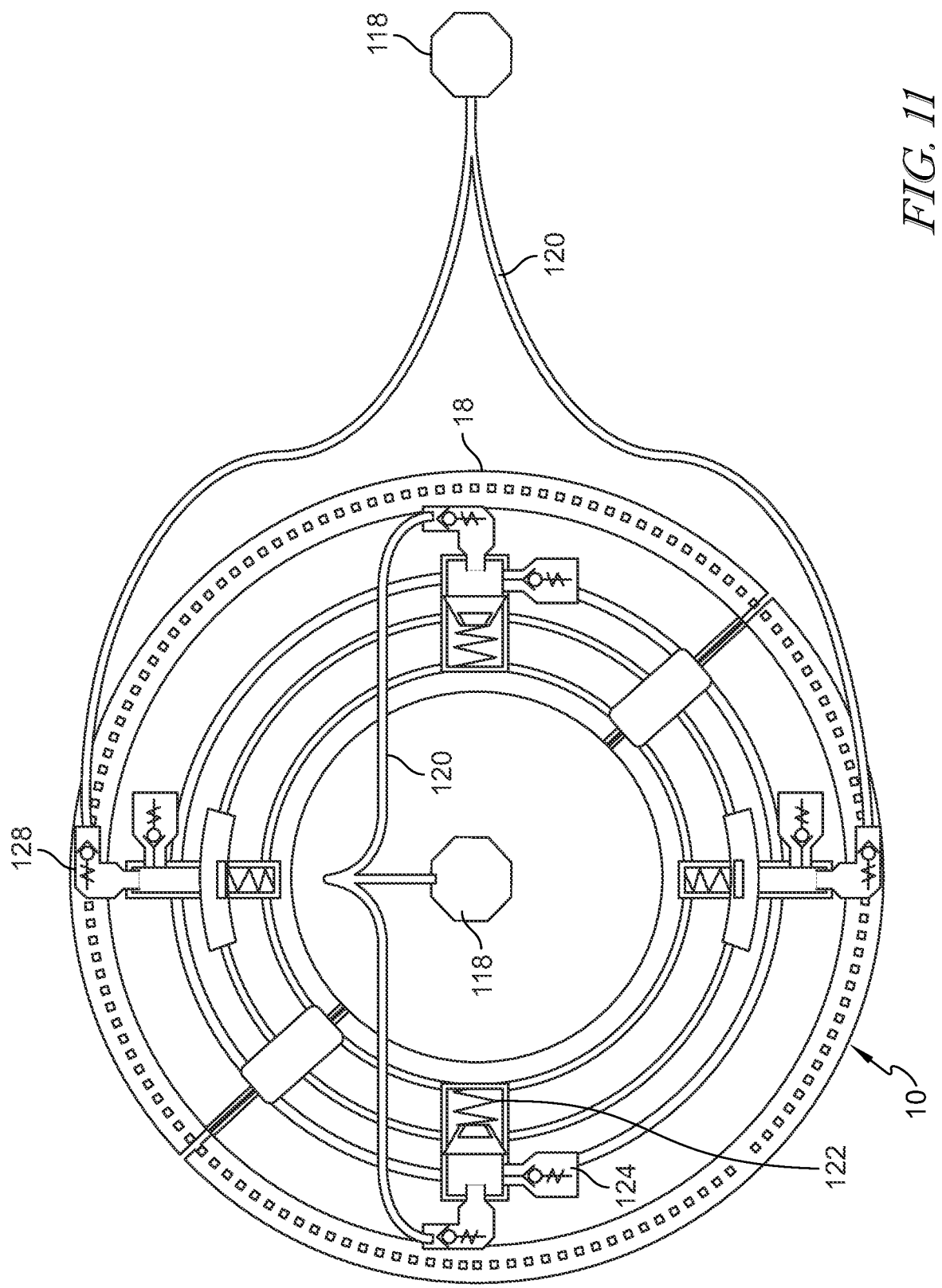
FIG. 11 shows an alternative embodiment of the attachment.

The fastening device 24 can also, as shown in FIG. 11, be actuatable via a pressure medium.

Preferably, the positioning device 22 is also actuatable via a pressure medium. In such an embodiment, the positioning device 22 and the fastening device 24 can preferably each be connected to pressure medium stores 118. Corresponding pressure medium lines 120 can be arranged in the attachment 10 itself or on the outside.

The fastening means and also the contact elements can be biased via springs 122.

The positioning device 22 and the fastening device 24 can have relief valves 124 in the form of non-return valves and inlet valves 128 also in the form of non-return valves.

An attachment 10 similar to the embodiment of FIG. 5 is shown in different views in FIGS. 12 to 18.

Figure 12:
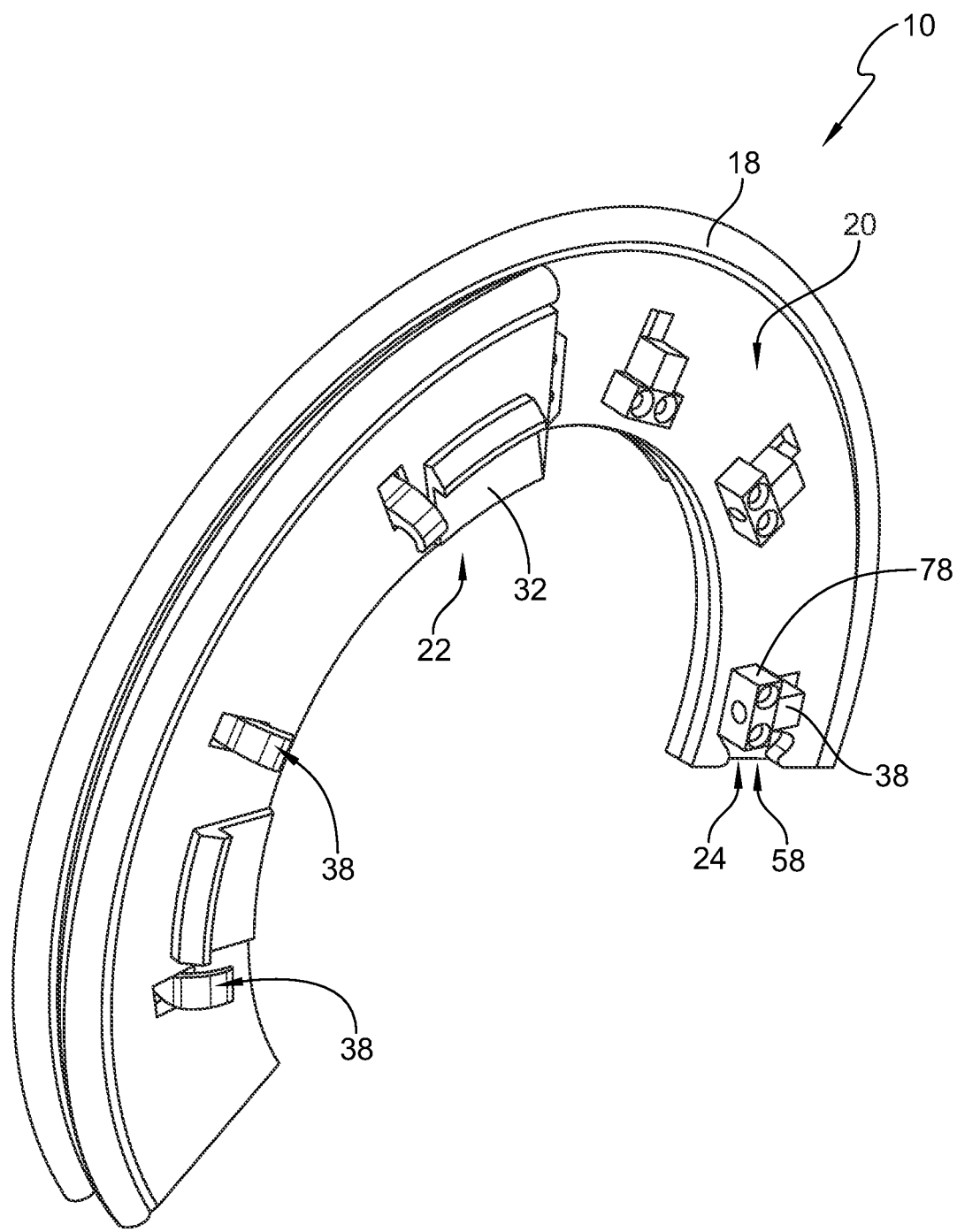
FIGS. 12 to 18 show an alternative embodiment of the attachment.
Figure 13:
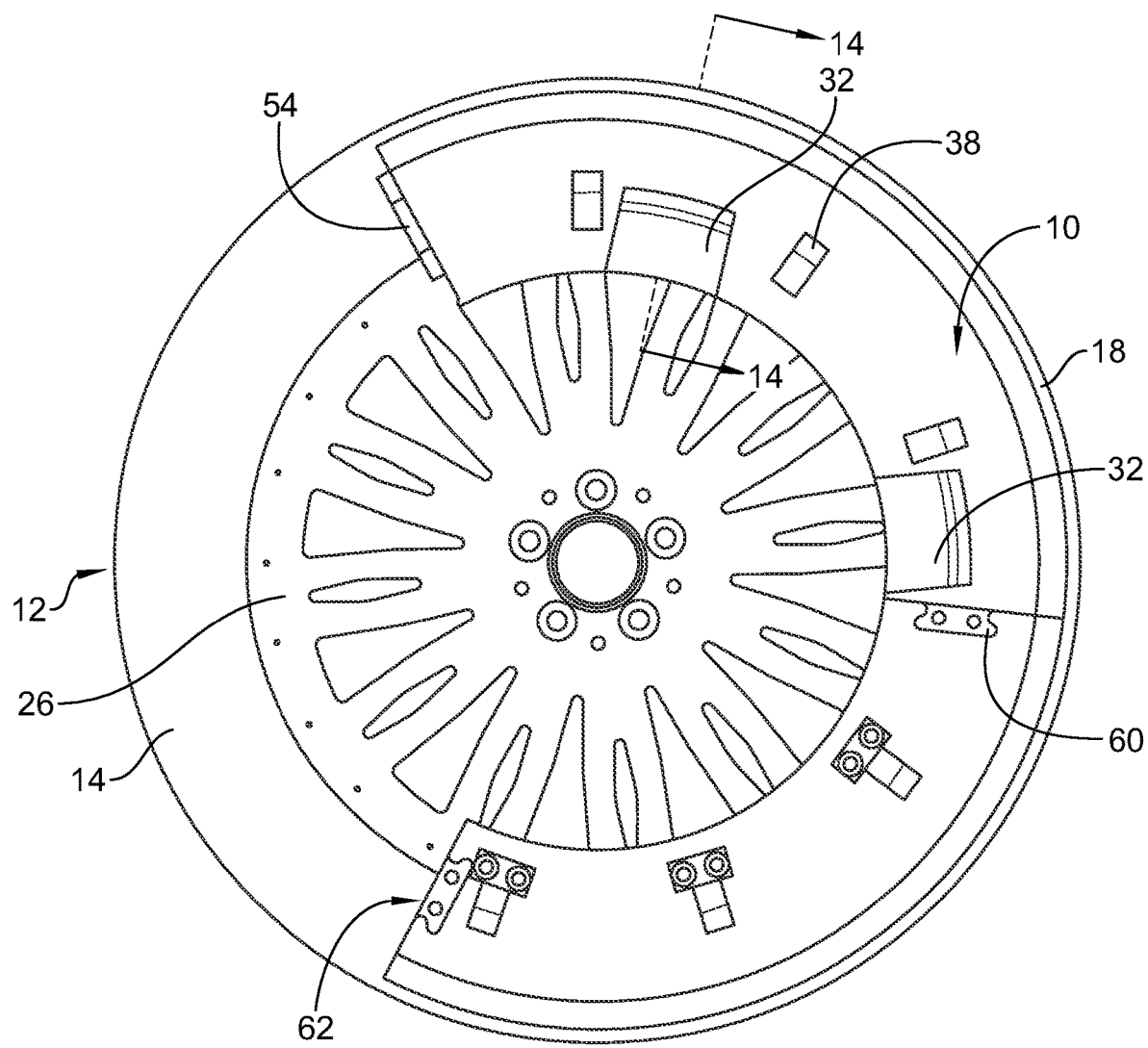
Figure 14:
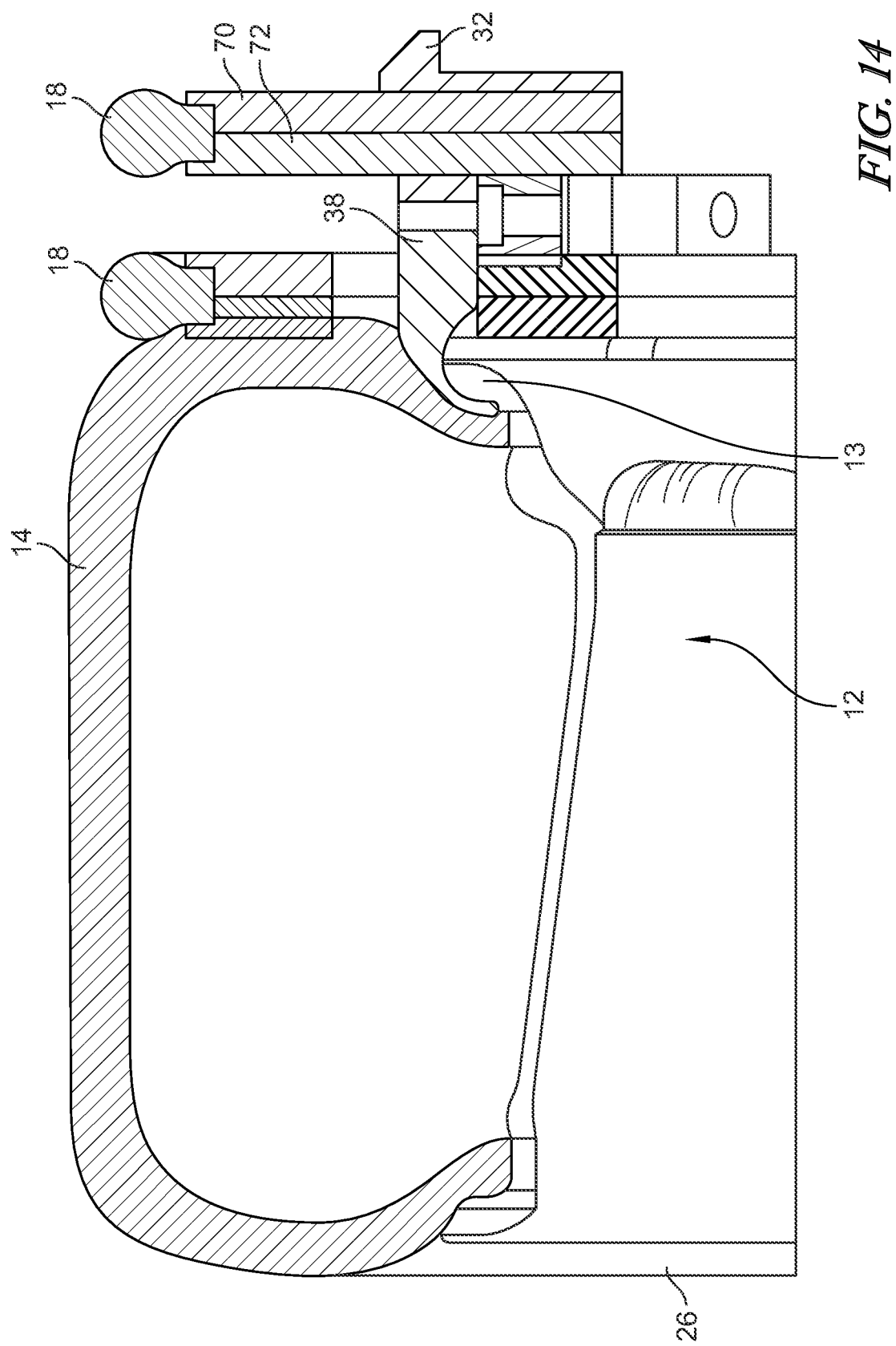
Figure 15:
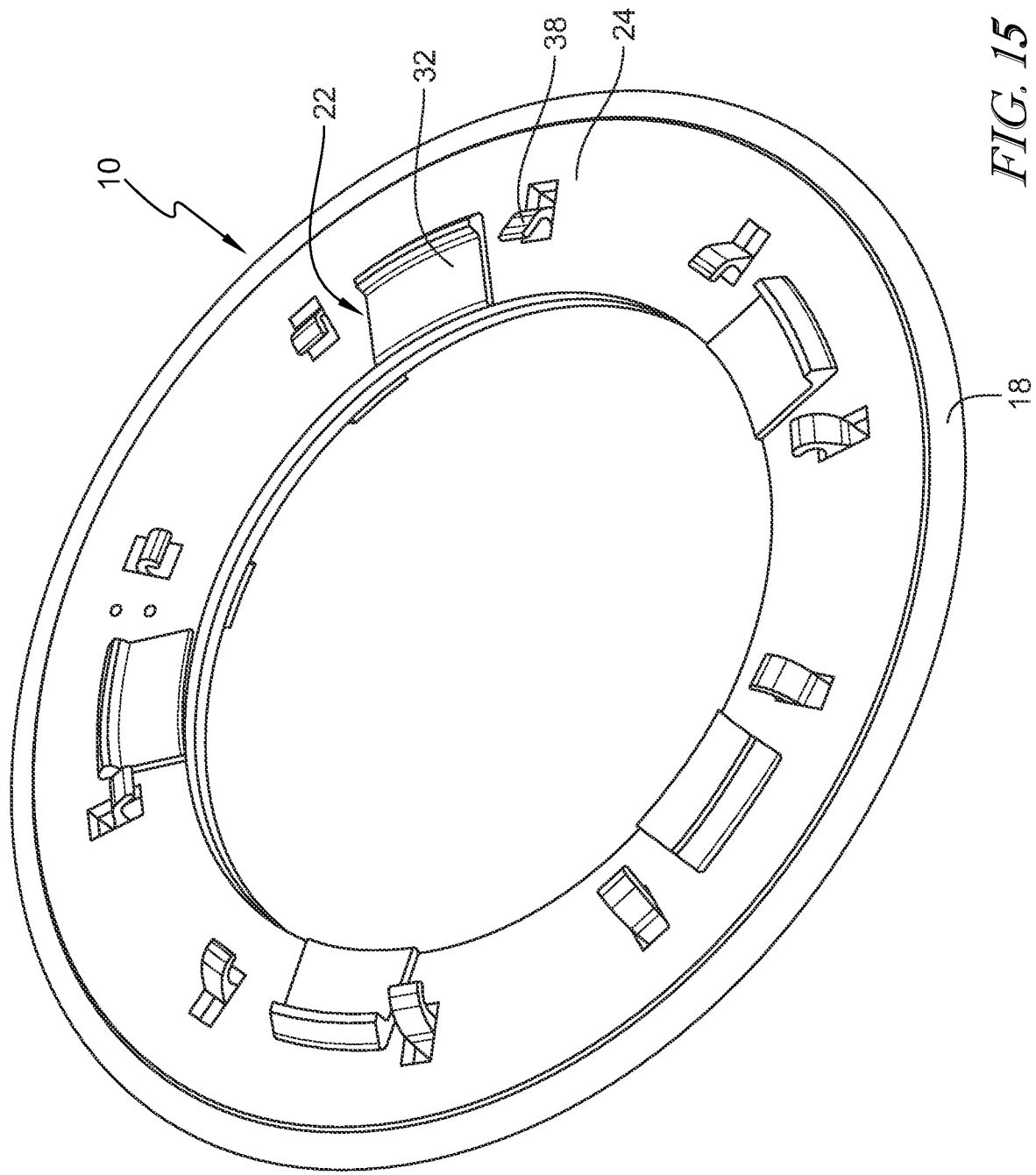
Figure 16:
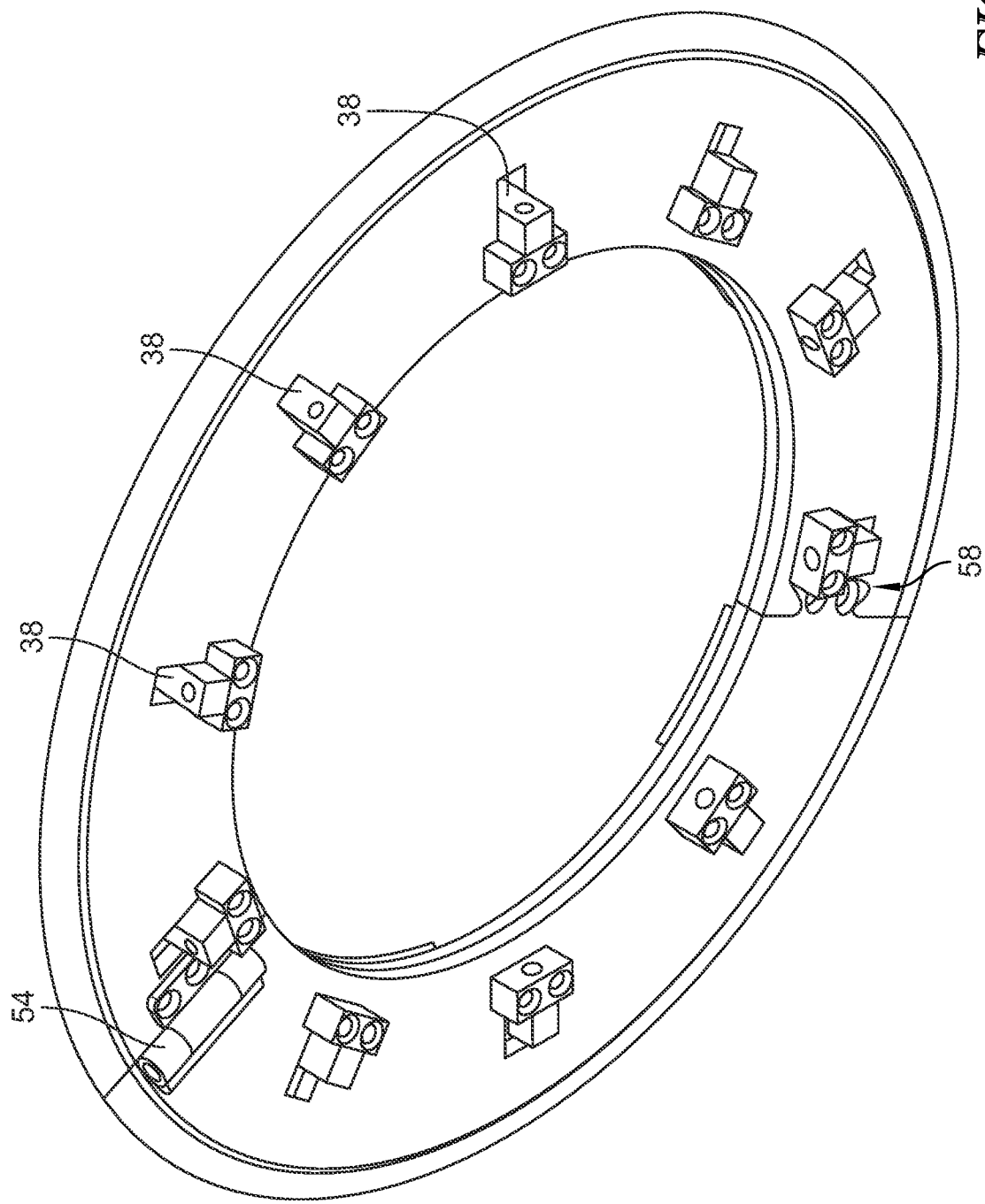
Figure 17:
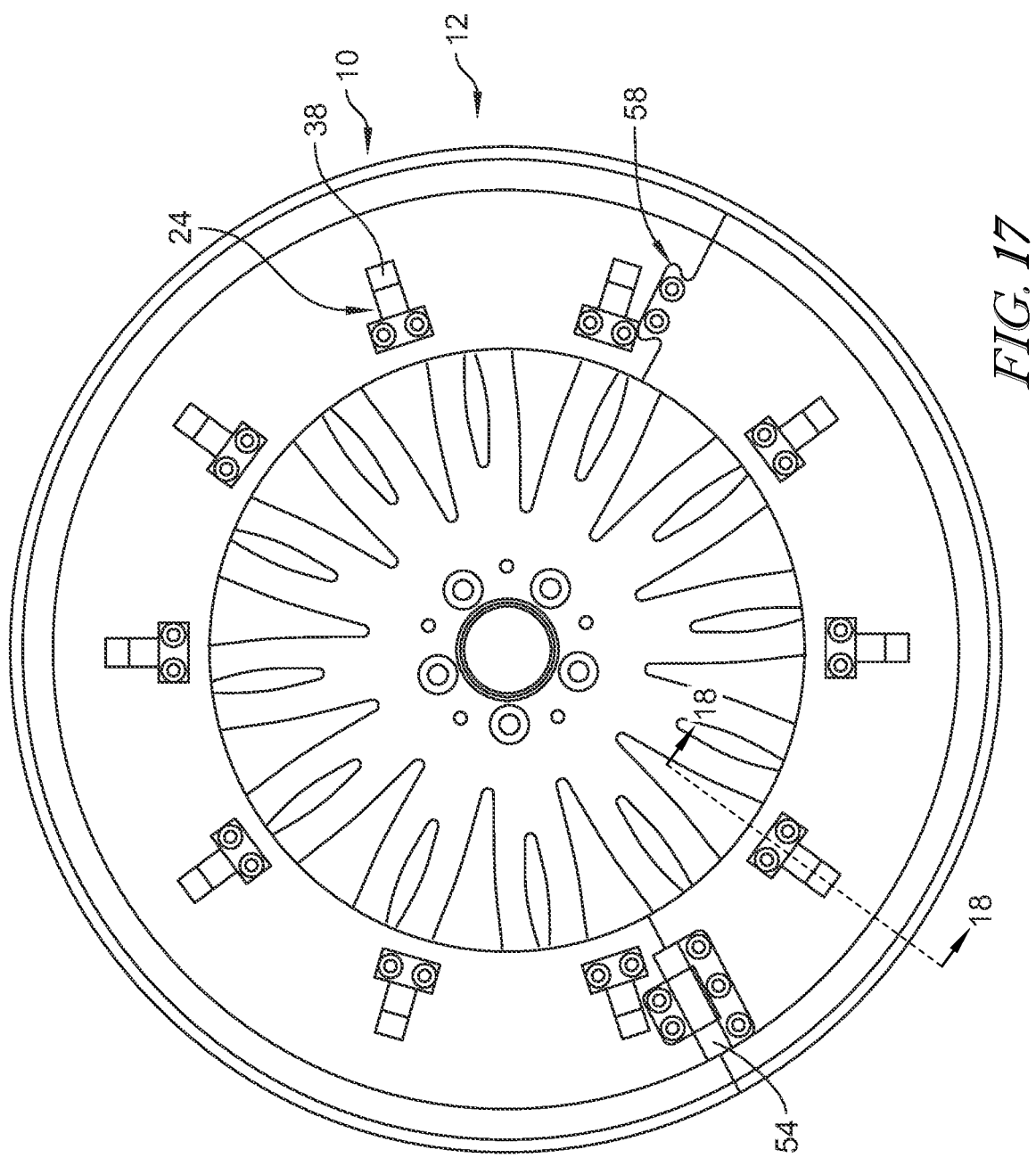
Figure 18:
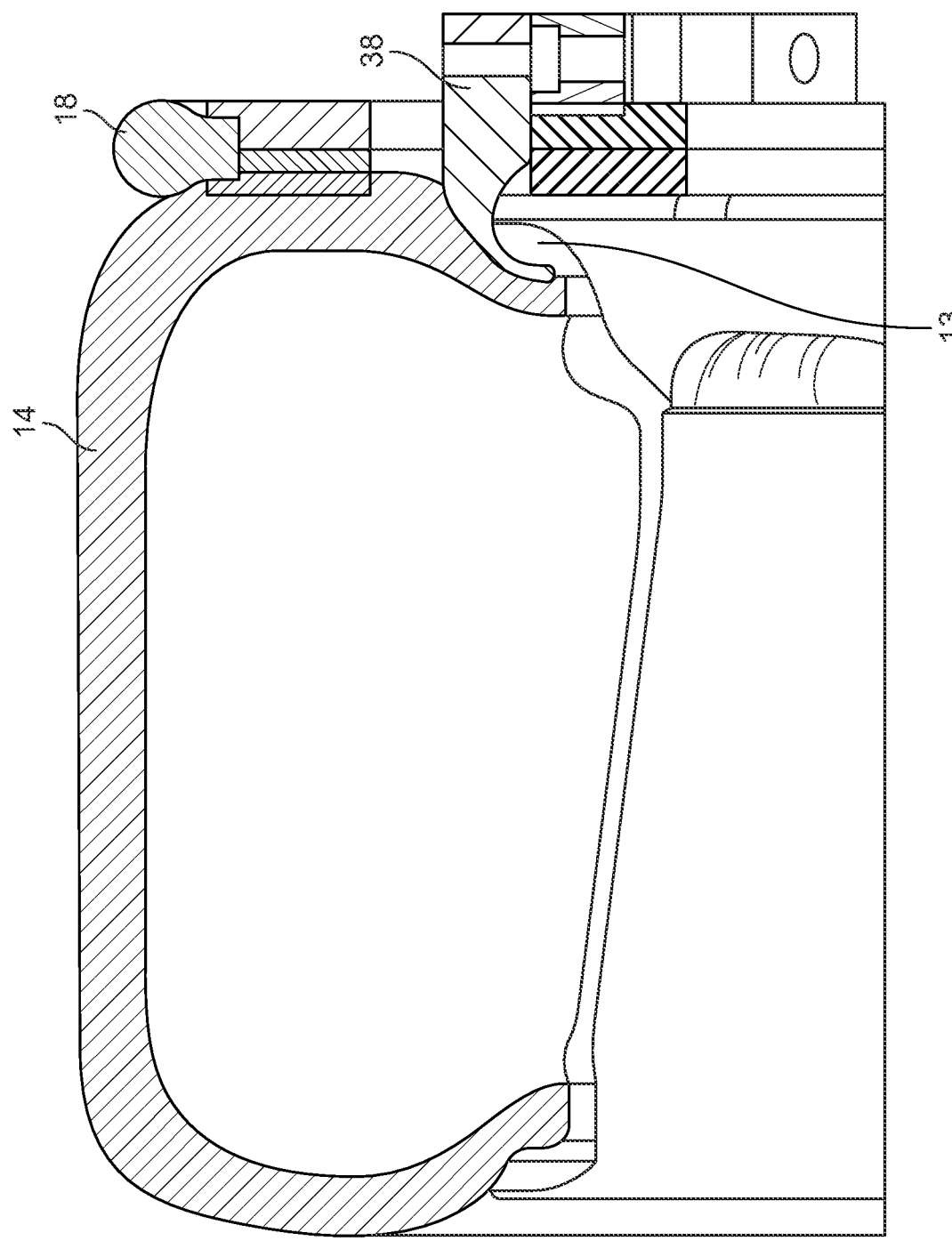
Figure 19:
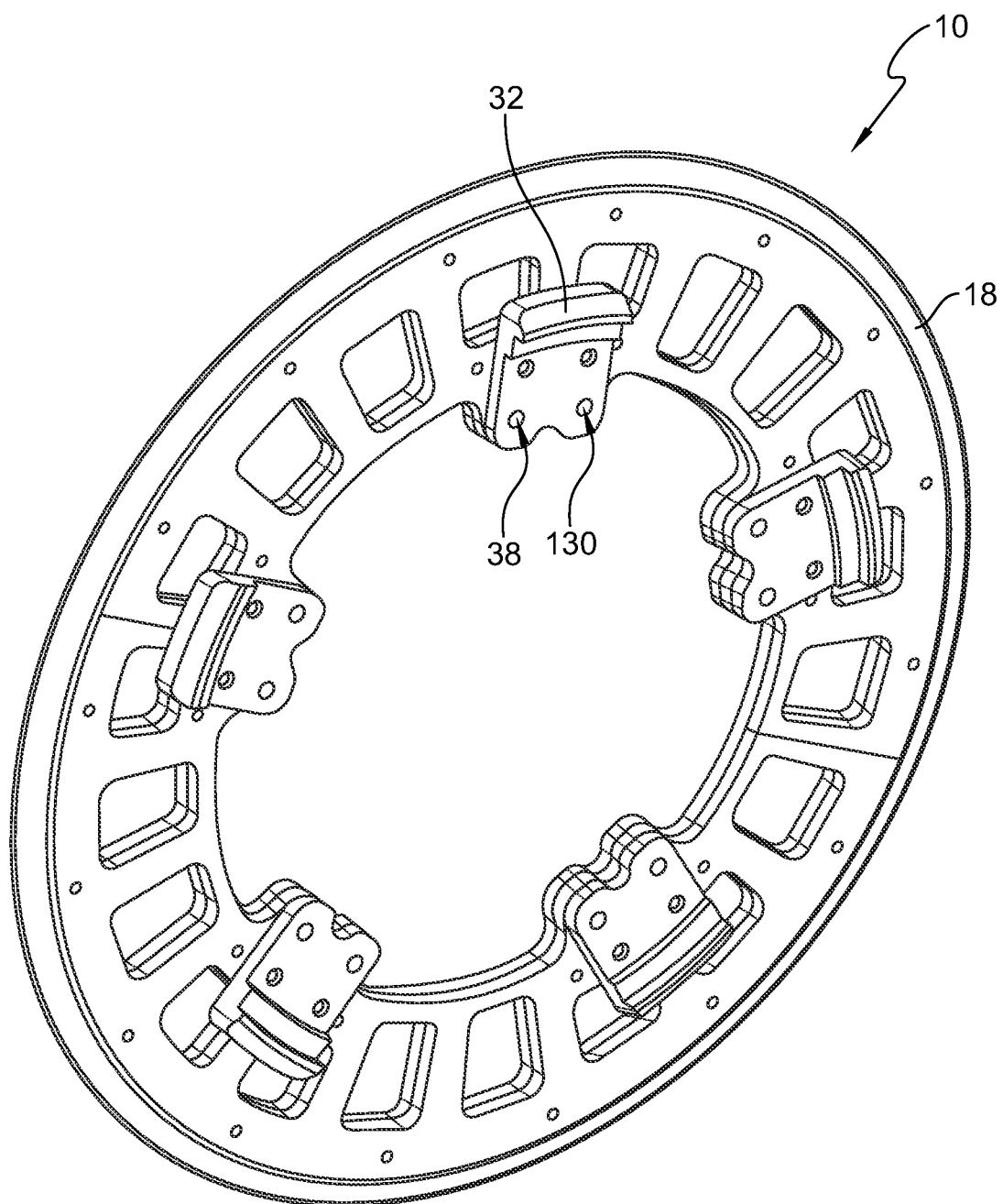
FIGS. 19 to 22 show an alternative embodiment of the attachment.
Figure 20:
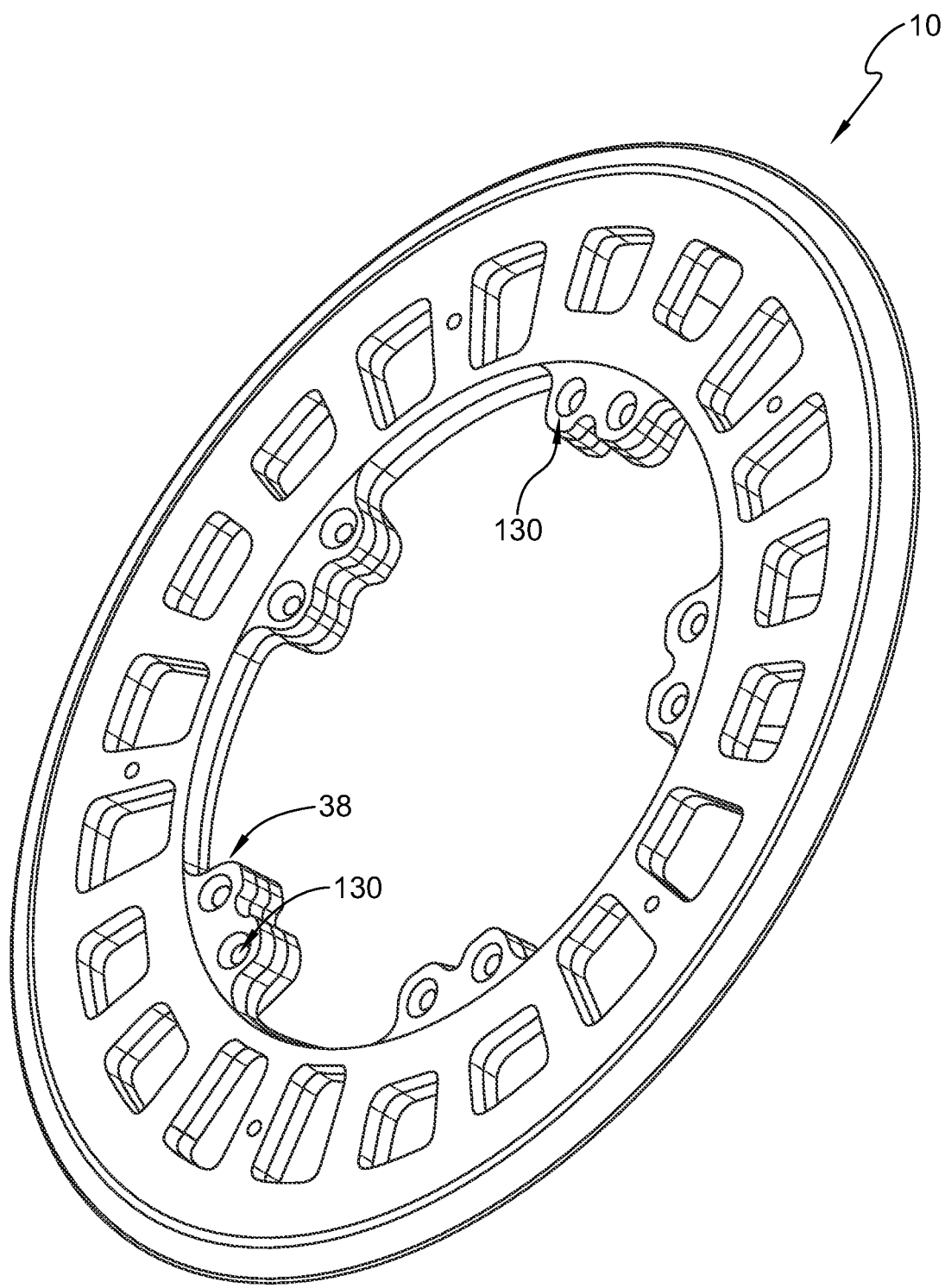
Figure 21:
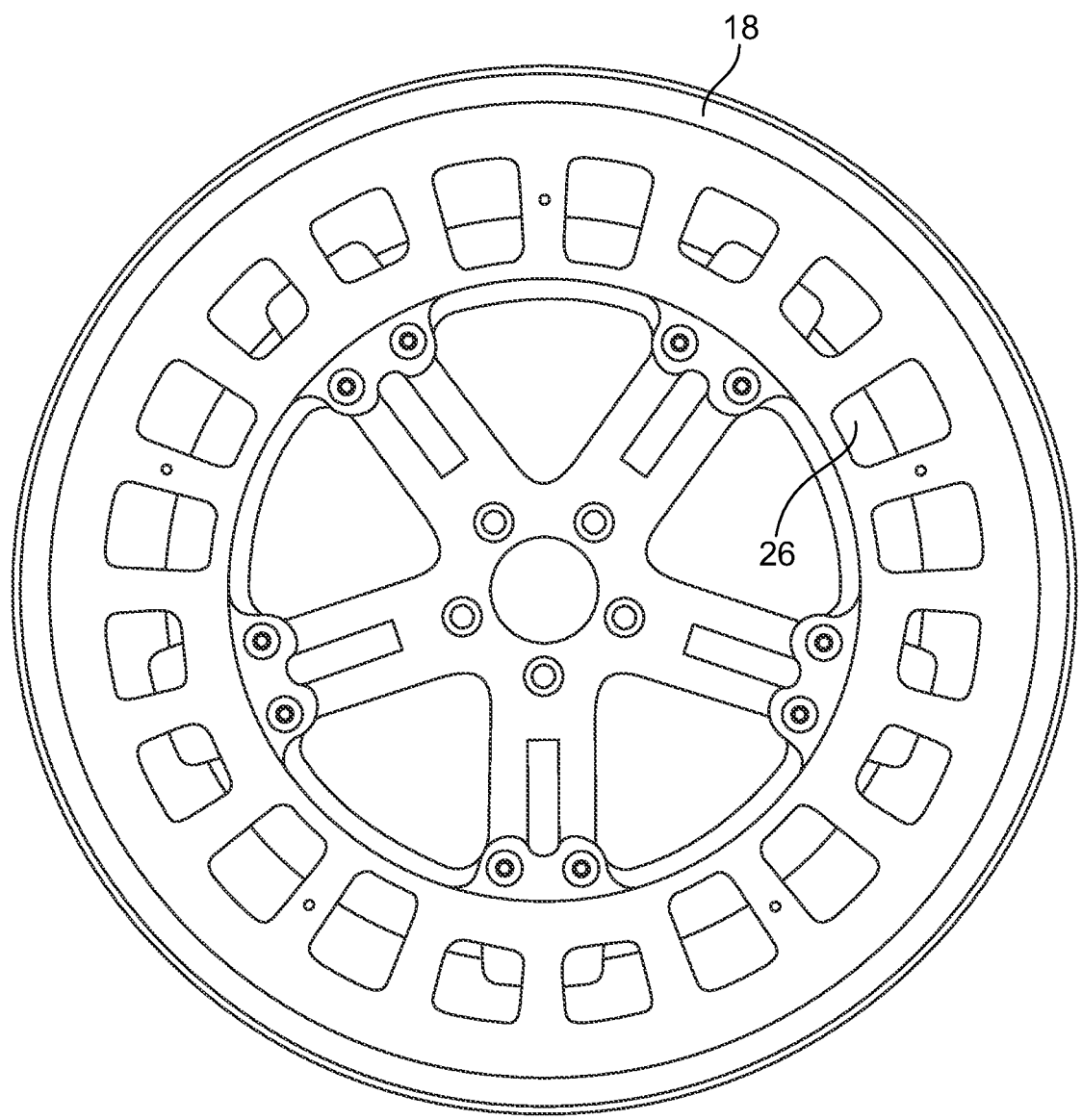
Figure 22:
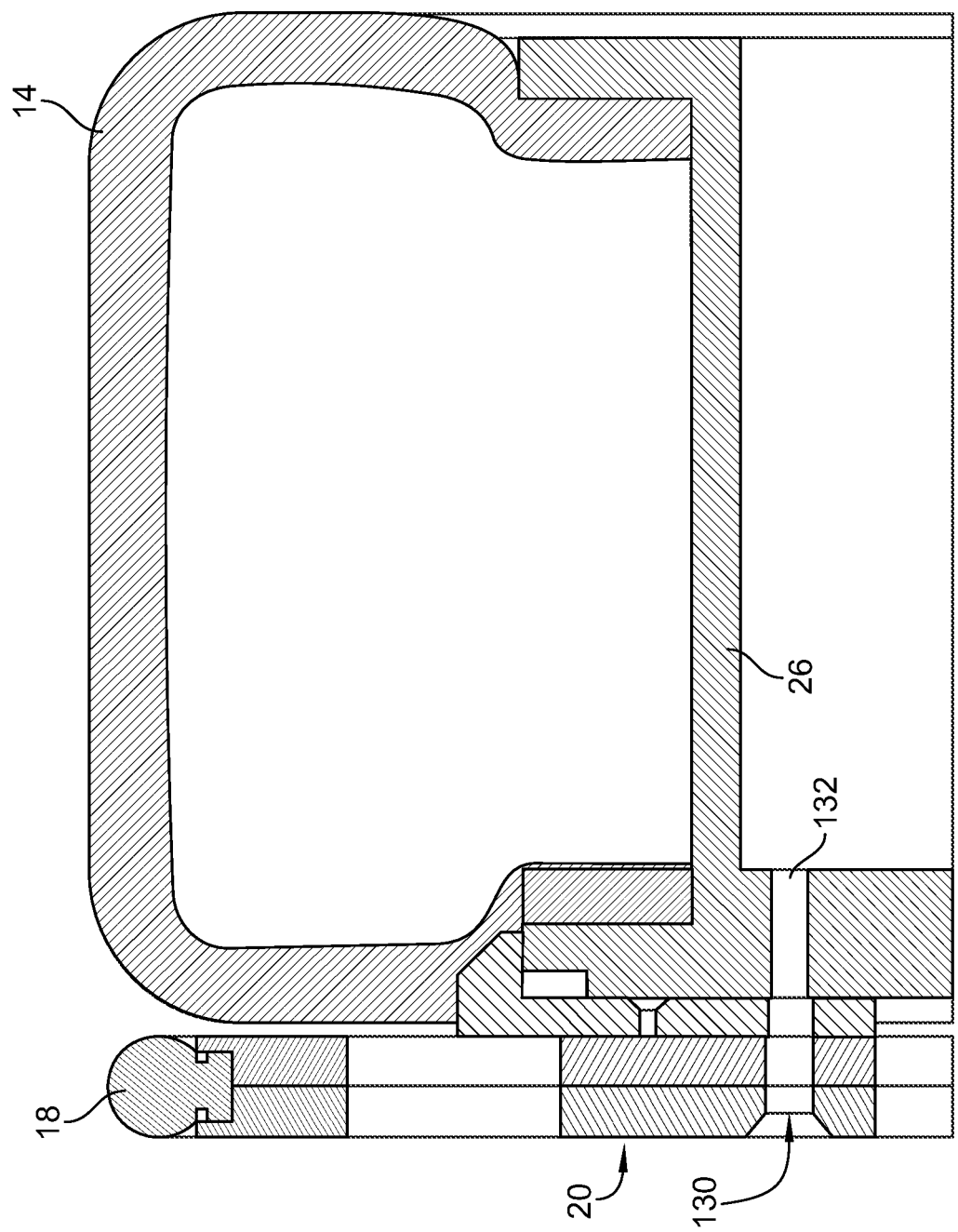

In FIGS. 12 to 14, the attachment is shown in the folded-in state, while in FIGS. 15 to 18 it is shown in the folded-out state. In FIGS. 13 and 17, the attachment 10 is in each case shown in the state mounted on the vehicle wheel 12.

The fastening means 38 can, however, also be in the form of screws which are able to engage through corresponding openings 130 in the base body 20 into corresponding screw receivers 132 on the rim 26 (see embodiment according to FIGS. 19 to 22). In this case, the screwing in of the screws constitutes the actuation of the fastening device 38.

The fastening device 24 can comprise a plurality of detachable fastening means 38. Which can be mounted in a plurality of radially offset positions corresponding to standardized rim flange diameters. The fastening means 38 are preferably mounted to be movable in the radial direction.

Figure 23A:
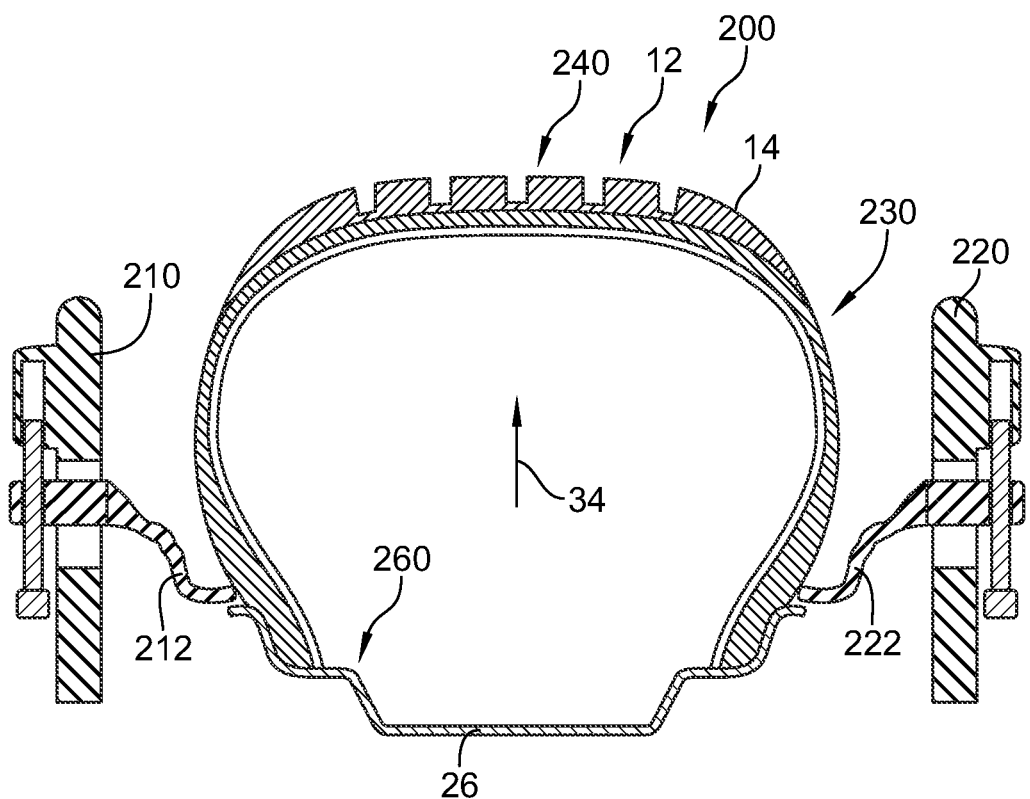
FIGS. 23A and 23B show a device for enabling emergency operation properties of a vehicle wheel.
Figure 23B:
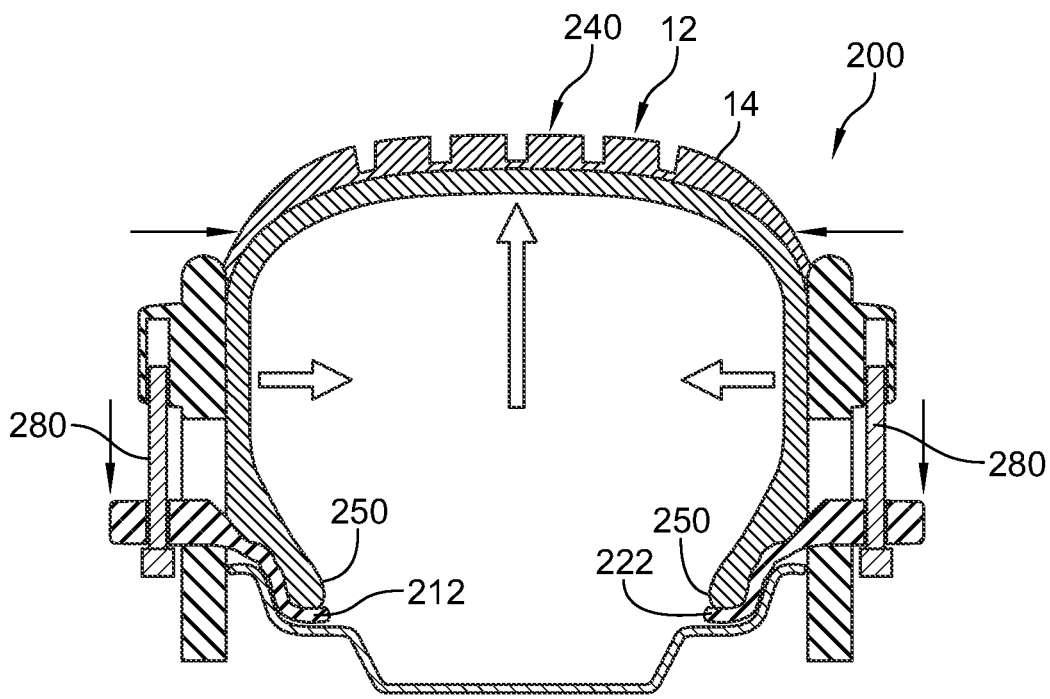

FIGS. 23A and 23B show a device 200 for enabling emergency operation properties of a vehicle wheel 12. The device 200 comprises a first support element 210, which is configured to be mounted on the vehicle wheel 12 on the vehicle side, and a second support element 220, which is configured to be mounted on the vehicle wheel 12 on the outer side 230 facing away from the vehicle. The support elements 210, 220 are so configured that, in an intended mounting position on the vehicle wheel 12 (see FIG. 23B), they apply pressure laterally to the side walls of the tire 14 of the vehicle wheel 12 in such a manner that a running surface 240 of the tire 14 is urged radially outwards.

The first support element 210 and the second support element 220 each have clamping arms 212, 222 for fastening the support elements 210, 220 to the rim 26 of the vehicle wheel 12. The clamping arms 212, 222 are so configured and so arranged in the intended mounting position (FIG. 23) that they engage between a tire bead 250 of the tire 14 and a rim well 260 of the rim 26 in such a manner that they lift the tire bead 250 from the rim well 260.

The device 200 comprises a fastening mechanism 280 which is so configured that, on fastening of the device 200 to the vehicle wheel 12, the first support element 210 and the second support element 220 can be clamped by means of the fastening mechanism 280 against the rim 26 in such a manner that they move towards the rim 26 until they come into contact therewith.

Figure 24:
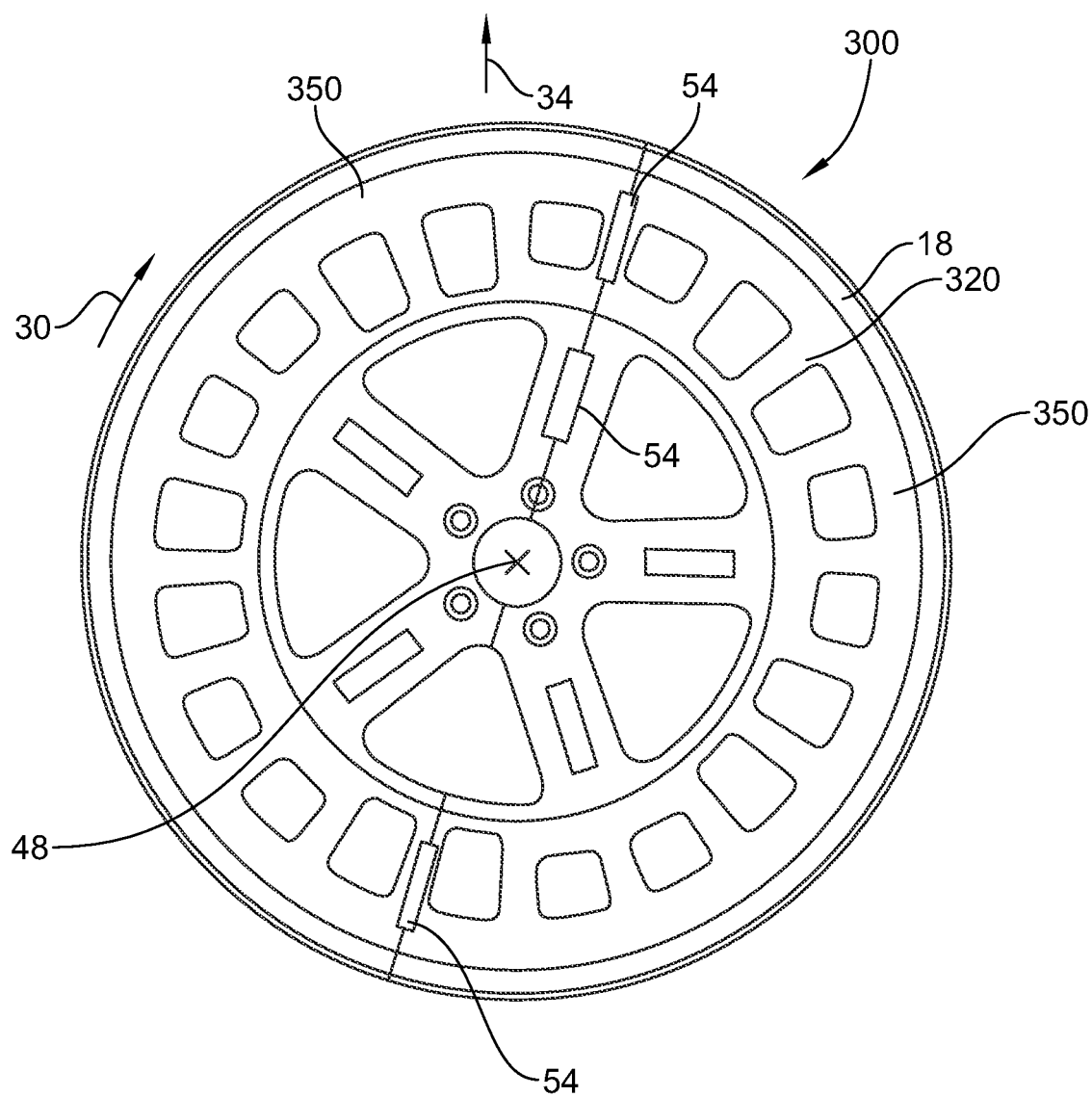
FIG. 24 shows an emergency wheel.
Figure 26B:
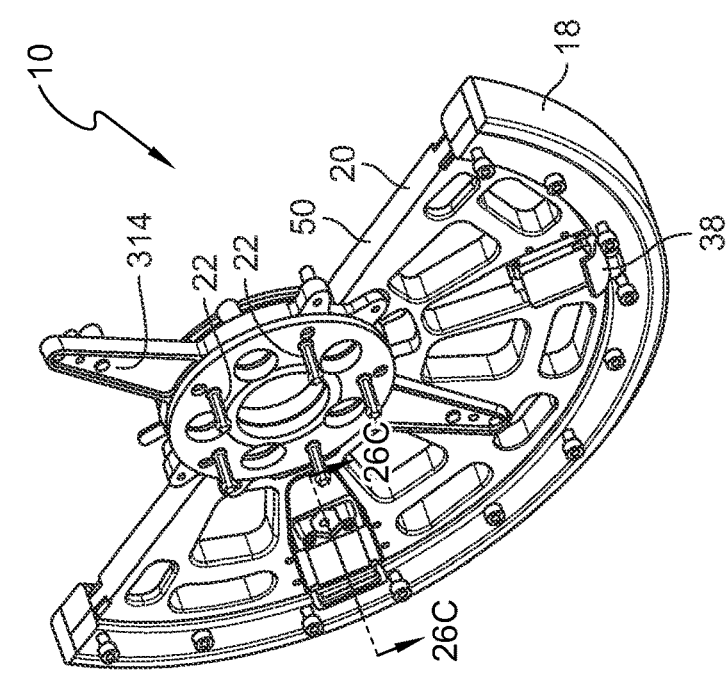
FIGS. 26A-26C show an alternative embodiment of the attachment.
Figure 26C:
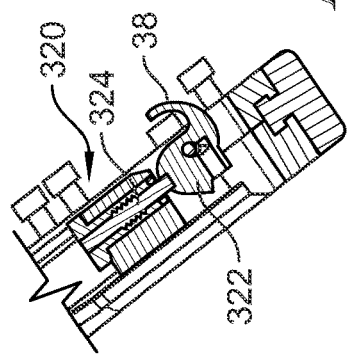
Figure 26A:
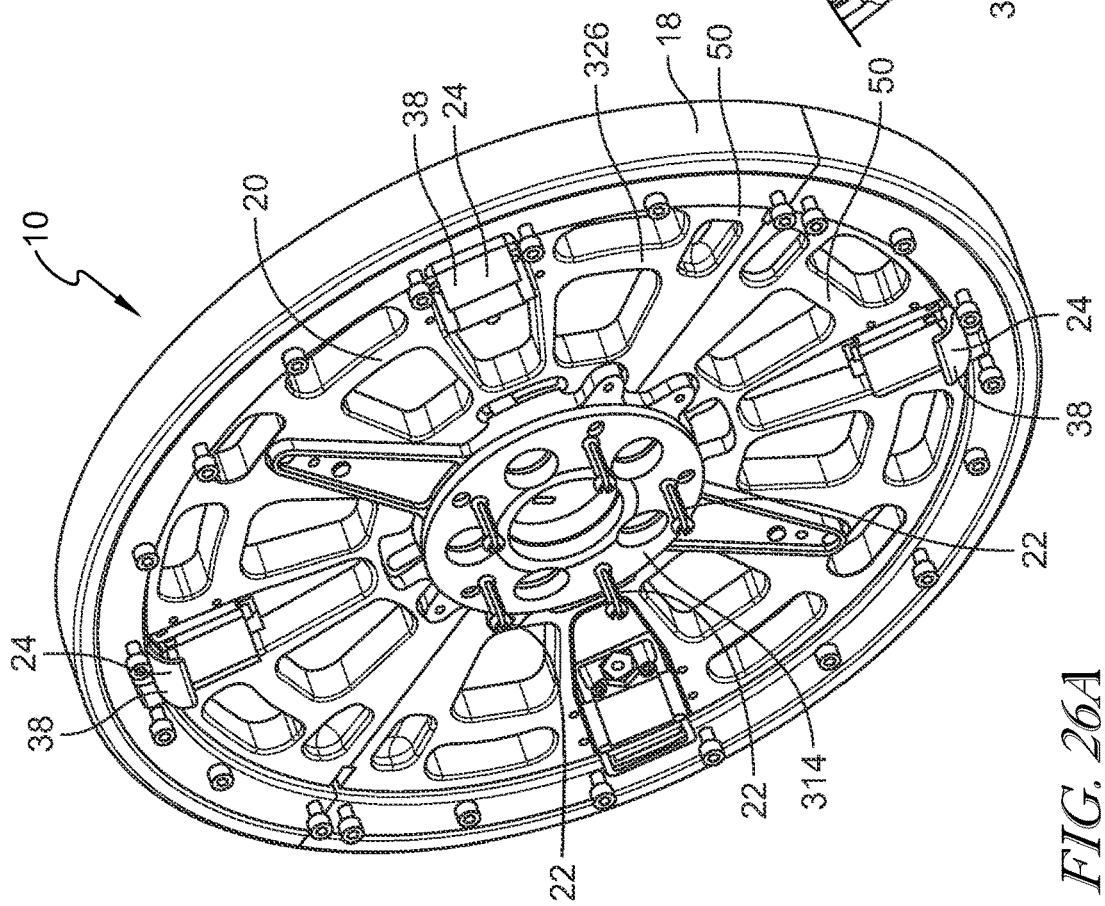

FIG. 24 shows an emergency wheel 300 having a base body 320 which can be fastened to a bolt circle of a wheel hub in place of a defective vehicle wheel 12 and, when seen in an axial direction 48, is circular or largely annular in shape, wherein the base body 320 comprises two circumferential segments 350. Subdivision into more circumferential segments 350 is conceivable.

The emergency wheel 320 is in such a form that the circumferential segments 350 are connected together in the circumferential direction 34 via a detachable folding mechanism 54. In addition or alternatively, connection via an engagement structure, preferably having a dovetail-shaped prolongation on one of the segments and a corresponding recess on a further of the segments 50, is also possible, similarly to the attachment of FIG. 3.

FIGS. 25A-25C and 26A-26C show an alternative embodiment of attachments 10. The attachment 10 in each case comprises a base body 20 which comprises two circumferential segments 50. The attachment 10 comprises positioning devices 22 which are in the form of grip devices 312 in order to be positioned on the vehicle wheel 12 by interlocking engagement of the grip devices 312 with a preferably circular opening in the rim 26, which opening is arranged in the region of the bolt circle, wherein the opening is arranged in the rim 26 spaced apart from holes which are provided in the rim 26 for receiving wheel bolts or stud bolts, preferably wherein the opening is a center opening of the rim 26 or is spaced apart from an axis of rotation of the rim. In particular, it is advantageous if the opening in the region of the bolt circle is a so-called poly control bore which is used for axle alignment. The grip devices 312 can also be configured to position the attachment 10 on the vehicle wheel 12 by friction-based engagement in the above-mentioned opening, in particular the poly control bore.

The attachment 10 further comprises an initial mounting portion 314.

The attachments 10 of FIGS. 25A-25C and 26A-26C are so configured that the attachment 10 has a tread portion 326, which comprises the two circumferential segments 50 of the attachment 10, and wherein the attachment 10 comprises an initial mounting portion 314, wherein at least part of the tread portion 326 is configured separately from the initial mounting portion 314 and detachably connectable thereto or is configured to be movable relative thereto, and wherein the initial mounting portion 314 is arranged radially inwards from the running surface when the attachment 10 is fastened to the vehicle wheel 12.

Preferably, the attachment 10 is so configured that the initial mounting portion 314 and the tread portion 326, that is to say the part of the attachment 10 comprising the running surface of the attachment 10, are configured separately and completely detachable from one another. Preferably, the tread portion 326 in turn comprises precisely two circumferential segments 50 which are detachable from one another and which can be assembled in such a manner that they form the circular running surface.

Preferably, part of the grip device 312 is in any case connected non-detachably to the attachment 10, preferably the initial mounting portion 314. The attachment 10, or the initial mounting portion 314, can thus be fastened particularly simply to the vehicle wheel 12. The attachment 10, or the initial mounting portion 314 of the correspondingly configured attachment 10, can as it were be inserted into those openings.

The fastening means 38 of the fastening device 24 are preferably in the form of a prefabricated part 316 which is screwed to the attachment 10. This is the case with the attachments 10 of FIGS. 25A-25C and 26A-26C.

Preferably, the fastening means 38 comprises a casing 318. This is clearly visible in the exploded representation of FIG. 25B).

Preferably, the fastening device 24 also comprises a locking mechanism 320.

Preferably, the attachment comprises a locking mechanism 320 which is configured and arranged to lock the fastening means 38, in particular a pivotably mounted hook element 322 of the fastening means 38, when it is in engagement behind the rim flange 13, preferably wherein the locking mechanism 320 comprises a preferably biased, in particular spring biased, catch element 324. It is preferred if the catch element 324 engages in a locking manner into the hook element 322 or the hook element 322 engages in a locking manner into the catch element 324 when the locking mechanism 320 locks the fastening means 38. The fastening of the attachment 10 to the rim 12 is thus particularly secure. In particular, the catch element 324 can be in the form of a bolt which is biased, in particular via a spring, wherein the pivotably mounted hook element 322 can have, for example, a recess into which the spring-biased bolt engages and locks the hook element when the hook element 322 has been pivoted into the engaged position with the rim 12. To that end, the recess is advantageously so arranged that, in the engaged position, it pivots over the catch element 324 so that the catch element 324 is able to enter the recess.

Preferably, the locking mechanism 320 is also arranged in the casing 318. The locking mechanism 320 and the fastening means 38 can thus be arranged, in any case partially, in a casing 318 which forms a type of housing for those components. It is preferred if the casing 318 or housing can be assembled individually with the components located therein and then the finished pre-assembled unit can be mounted or is mounted on the attachment 10 as a prefabricated part 316.

The invention claimed is:

1. An attachment for a vehicle wheel for enabling driving operation with a flat tire, the attachment comprising:
    a base body which, when seen in an axial direction, is circular or annular in shape,
    a positioning device for positioning the attachment on a rim of the vehicle wheel, and
    a fastening device to fasten the attachment to the rim of the vehicle wheel, the fastening device configured to be actuated independently of the positioning device,
    wherein the positioning device comprises at least two contact elements distributed uniformly on the base body in a circumferential direction thereof, the at least two contact elements configured to be fixed in any of a plurality of fixing positions, each corresponding to a different diameter of a rim flange of the rim, in order to position the attachment in a centered manner on the rim with a corresponding rim flange diameter
    and wherein the contact elements are lockable in each of the plurality of fixing positions associated with a respective one of the different rim flange diameters, so that the attachment can then be mounted or clipped onto the rim.

2. The attachment of claim 1, wherein the fastening device comprises at least one pressure measuring device configured to detect a clamping of the fastening device against the rim.

3. The attachment of claim 1, wherein the fastening device comprises at least one detachable fastening member configured to be mounted so as to be movable in a radial direction relative to the rim.

4. The attachment of claim 3, wherein the at least one detachable fastening member comprises at least two fastening members,
    and wherein the fastening device further comprises a coupling mechanism which, on actuation, couples a movement of the at least two fastening members in at least one of the radial direction and the axial direction,
    and wherein the coupling mechanism is so configured that the movement of the at least two fastening members is uniform.

5. The attachment of claim 4, wherein the coupling mechanism comprises a clamping ring movable in the axial direction in response to rotation of the clamping ring in a circumferential direction relative to the rim, wherein the fastening device is configured to be actuated by movement of the clamping ring in the axial direction.

6. The attachment of claim 4, wherein the coupling mechanism comprises a clamping element configured to connect together the at least two fastening members, wherein the clamping element is configured to be shortened or lengthened in the radial direction such that the fastening device can thereby be actuated by shortening or lengthening the clamping element.

7. The attachment of claim 1, wherein at least one of the fastening device and the positioning device is pneumatically or hydraulically actuatable.

8. The attachment of claim 1, wherein the fastening device is so configured that the fastening device contacts the rim over at least a sixth of a circumferential extent of the fastening device when the attachment is fastened to the vehicle wheel.

9. The attachment of claim 1, wherein the fastening device is so configured that the attachment, when fastened and clamped to the rim of the vehicle wheel, is urged in the axial direction towards the rim.

10. The attachment of claim 1, wherein the fastening device comprises a clamping surface which, when seen in the axial direction, slopes radially inwards, wherein the fastening device is so configured that the clamping surface, on fastening and clamping of the attachment to the rim, moves radially inwards, and wherein the clamping surface is so configured that the attachment, on fastening and clamping to the rim of the vehicle wheel, is urged in the axial direction towards the rim.

11. An attachment for a vehicle wheel for enabling driving operation with a flat tire, the attachment comprising:
    a base body which, when seen in an axial direction, is circular or annular in shape,
    a positioning device for positioning the attachment on a rim of the vehicle wheel, and
    a fastening device to fasten the attachment to the rim of the vehicle wheel, the fastening device configured to be actuated independently of the positioning device,
    wherein the base body comprises a rim-side part and another part which faces away from the rim and which is detachable from the rim-side part.

12. The attachment of claim 1, wherein the base body comprises at least two circumferential segments.

13. The attachment of claim 12, wherein the circumferential segments are connected together in the circumferential direction with one of a detachable folding mechanism and an engagement structure.

14. The attachment of claim 11, wherein the rim-side part and the another part, in an assembled state thereof, form a receiving portion in which at least a segment of a tread body can be inserted in an interlocking manner on assembly into the assembled state.

15. A device for enabling driving operation of a vehicle wheel with a flat tire, the device comprising:
    a first support element configured to be mounted on a vehicle side of the vehicle wheel, and
    a second support element configured to be mounted on the vehicle wheel an on the outer side thereof opposite the vehicle side,
    wherein the first and second support elements are so configured that, in mounting positions thereof on the vehicle wheel, the first and second support elements apply pressure laterally to side walls of the tire in such a manner that a running surface of the tire is urged radially outwards.

16. The device of claim 15, wherein first support element and the second support element each have clamping arms to fasten the first and second support elements to a rim of the vehicle wheel, wherein the clamping arms are so configured to engage between a tire bead of the tire and a rim well of the rim so as to lift the tire bead from the rim bed.

17. The device of claim 16, further comprising a fastening member configured to fasten the device to the vehicle wheel,
    wherein the first and second support members are configured to be clamped against the rim,
    and wherein, on fastening of the device to the vehicle wheel with the fastening member, the first support element and the second support element are clamped against the rim in such a manner that the first and second support elements move towards the rim until the first and second support elements come into contact with the rim.

\* \* \* \* \*